US012511564B2

(12) United States Patent
Simmons et al.

(10) Patent No.: US 12,511,564 B2
(45) Date of Patent: Dec. 30, 2025

(54) SYSTEMS, DEVICES, ARTICLES, AND METHODS TO INTERACT WITH INFORMATION STORED IN ORBITAL STATES ASSOCIATED WITH SILICON DEFECTS

(71) Applicant: PHOTONIC INC., Coquitlam (CA)

(72) Inventors: Stephanie Simmons, Burnaby (CA); Michael L. W. Thewalt, Vancouver (CA)

(73) Assignee: PHOTONIC INC., Coquitlam (CA)

( * ) Notice: Subject to any disclaimer, the term of this patent is extended or adjusted under 35 U.S.C. 154(b) by 1008 days.

(21) Appl. No.: 17/596,681

(22) PCT Filed: Aug. 6, 2020

(86) PCT No.: PCT/CA2020/051078
§ 371 (c)(1),
(2) Date: Dec. 16, 2021

(87) PCT Pub. No.: WO2021/022376
PCT Pub. Date: Feb. 11, 2021

(65) Prior Publication Data
US 2022/0366290 A1    Nov. 17, 2022

Related U.S. Application Data

(60) Provisional application No. 62/883,597, filed on Aug. 6, 2019.

(51) Int. Cl.
*G06N 10/40* (2022.01)
*G06N 10/20* (2022.01)
*H10D 62/40* (2025.01)

(52) U.S. Cl.
CPC ............. *G06N 10/40* (2022.01); *G06N 10/20* (2022.01); *H10D 62/40* (2025.01)

(58) Field of Classification Search
CPC ........ G06N 10/40; G06N 10/20; H01L 29/04; H01L 29/122
See application file for complete search history.

(56) References Cited

U.S. PATENT DOCUMENTS

2008/0128713 A1* 6/2008 Saito ........................ H01L 33/34
438/22
2018/0330266 A1* 11/2018 Simmons ............... G06N 10/00

FOREIGN PATENT DOCUMENTS

WO          2017089891 A1      6/2017
WO    WO-2019224789 A1 *  11/2019    ............. B82Y 10/00
WO    WO-2021051206 A1 *   3/2021    ............. G02F 1/025

OTHER PUBLICATIONS

WO-2021051206-A1_ translated (Year: 2021).*
(Continued)

*Primary Examiner* — Lisa M Caputo
*Assistant Examiner* — Michael J Singletary
(74) *Attorney, Agent, or Firm* — Oyen Wiggs Green & Mutala LLP

(57) ABSTRACT

Various systems, devices, articles and methods apply one or more luminescent defects disposed within a semiconductor body. A respective luminescent defect included in the one or more luminescent defects has a plurality of orbital states. An information processing device including a semiconductor body and one or more luminescent defects. A system including at least one processor and a quantum information processor comprising at least one luminescent defect. Methods for operation of devices and systems including one or more luminescent defects.

30 Claims, 15 Drawing Sheets

(56) References Cited

OTHER PUBLICATIONS

WO-2019224789-A1_translated (Year: 2019).*
Schoenfeld, J. et al., "Coherent manipulation of valley states at multiple charge configurations of a silicon quantum dot device", Nature Communications 8:64, 2017.
Morton, J. et al., "Embracing the quantum limit in silicon computing", Nature, vol. 479, Nov. 17, 2011.
Akhlaghi, M.K. et al., "Waveguide integrated superconducting single-photon detectors implemented as near-perfect absorbers of coherent radiation", Nature Communications 6: 8233 (2015).
Eisaman, M.D. et al., "Invited Review Article: Single-photon sources and detectors", Rev. Sci. Instrum. 82, 071101 (2011).
Braginsky, V.B. et al., "Quantum nondemolition measurements: the route from toys to tools", Reviews of Modern Physics, vol. 68, No. 1, 1996.
Hartmann, S.R. et al., "Nuclear Double Resonance in the Rotating Frame", Phys. Rev. 128:2042-2053 (1962).

\* cited by examiner

| | Partial Code 1 | Partial Code 2 | Code 3 | Code 4 | Code 5 |
|---|---|---|---|---|---|
| $\|0\rangle$ | $\|1s:A, *, *\rangle$ | $\|1s:A, \downarrow, *\rangle$ | $\|1s:T_2(G8), \downarrow, \downarrow\rangle$ | $\|1s:A, \downarrow, \uparrow\rangle$ | $\|1s:E, \downarrow, \downarrow\rangle$ |
| $\|1\rangle$ | $\|1s:T_2, *, *\rangle$ | $\|1s:T_2(G7), \uparrow, *\rangle$ | $\|1s:E, \downarrow, \downarrow\rangle$ | $\|1s:E, \uparrow, \downarrow\rangle$ | $\|1s:E, \uparrow, \uparrow\rangle$ |
| ΔE | N/A | 356A,B | 358 | 360 | 362 |

FIG. 4

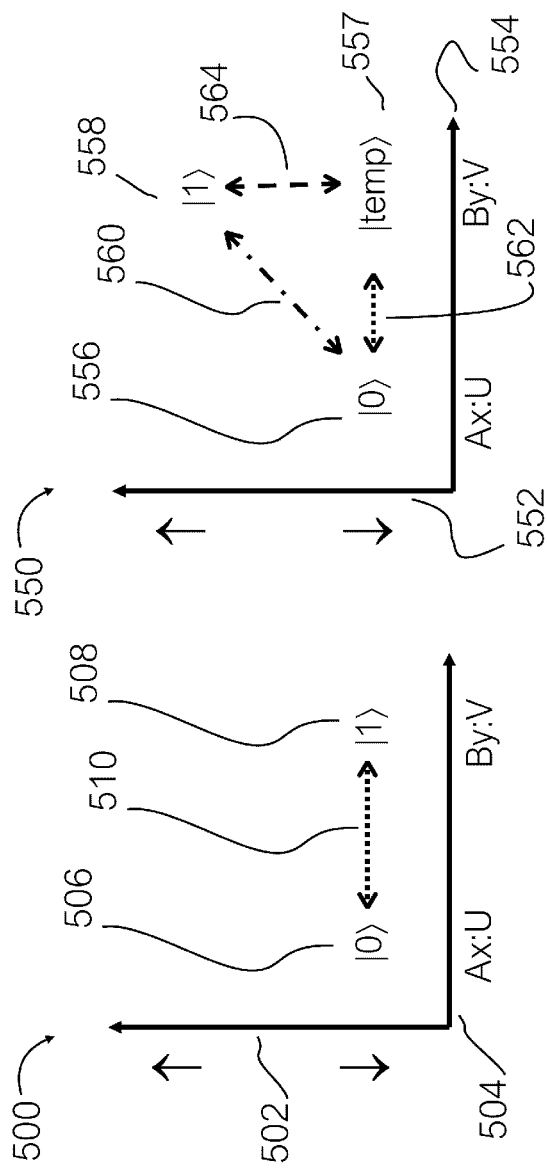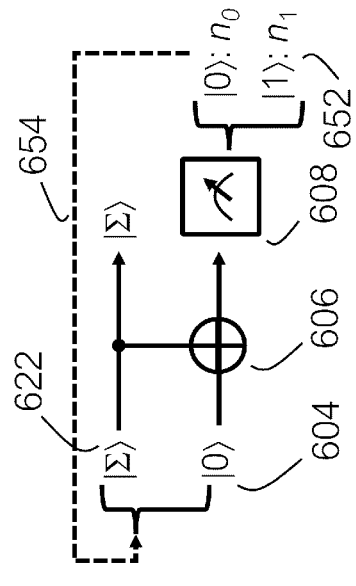

SYSTEMS, DEVICES, ARTICLES, AND METHODS TO INTERACT WITH INFORMATION STORED IN ORBITAL STATES ASSOCIATED WITH SILICON DEFECTS

CROSS-REFERENCE TO RELATED APPLICATIONS

This application claims priority from U.S. application No. 62/883,597 filed 6 Aug. 2019 and entitled SYSTEMS, DEVICES, ARTICLES, AND METHODS TO INTERACT WITH INFORMATION STORED IN ORBITAL STATES ASSOCIATED WITH SILICON DEFECTS which is hereby incorporated herein by reference for all purposes. For purposes of the United States of America, this application claims the benefit under 35 U.S.C. § 119 of U.S. application No. 62/883,597 filed 6 Aug. 2019 and entitled SYSTEMS, DEVICES, ARTICLES, AND METHODS TO INTERACT WITH INFORMATION STORED IN ORBITAL STATES ASSOCIATED WITH SILICON DEFECTS.

FIELD

The present disclosure relates to quantum information processing operations for computational states including two or more local configuration states of luminescent defects in semiconductor material (e.g., orbital states of local deep-level defects in silicon).

BACKGROUND

Information is contained in the state of a physical system. The physical system may be a quantum system or a classical system. Systems include tangible devices such as electrical components defined on or within one or more substrates. The physical system may include one or more photons that may interact with or otherwise communicatively couple other physical components.

SUMMARY

One aspect of the invention provides quantum information processing devices that include a semiconductor body, consisting principally of silicon, and one or more luminescent defects disposed within the semiconductor body. A respective luminescent defect included in the one or more luminescent defects has a plurality of orbital states. The plurality of orbital states includes a pair of orbital states that represents computational information. The device further includes a control system, comprising circuitry, communicatively coupled to the semiconductor body and, in response to execution of processor executable instructions, initializes the one or more luminescent defects.

Another aspect of the invention provides information processing systems that include a quantum information processor which includes a semiconductor body consisting principally of silicon, and a first luminescent defect disposed within the semiconductor body. The first luminescent defect includes a first plurality of spin-valley-orbital states, including a first spin-valley-orbital state, and a second spin-valley-orbital state. The system includes a control subsystem communicatively coupled to the quantum information processor, at least one processor communicatively coupled to the control subsystem, and at least one tangible computer-readable storage device communicatively coupled to the at least one processor and which stores processor-executable instructions. The processor-executable instructions which, when executed by the at least one processor, cause the at least one processor to direct the control subsystem to initialize the first luminescent defect to a first computational state that includes the first spin-valley-orbital state.

Other aspects of the invention provide: information processors substantially as described and illustrated herein; systems that include at least one processor and a quantum information processor substantially as described and illustrated herein; Methods of operation of information processors substantially as described and illustrated herein; methods of operation of a system including a digital computer and an analog computer substantially as described and illustrated herein; communication devices substantially as described and illustrated herein; and/or photon sources substantially as described and illustrated herein.

Further aspects and example embodiments are illustrated in the accompanying drawings and/or described in the following description.

It is emphasized that the invention relates to all combinations of the above features, even if these are recited in different claims.

BRIEF DESCRIPTION OF THE DRAWINGS

The accompanying drawings illustrate non-limiting example embodiments of the invention.

FIG. 4 is a table illustrating computational states based on the energy levels shown in FIGS. 3A and 3B.

FIG. 5A and FIG. 5B are schematic diagrams illustrating computational states based on the energy levels shown in FIGS. 3A and 3B.

FIG. 6A and FIG. 6B are schematic diagrams illustrating measurement operations via an ancillary photon.

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

Disclosed herein are systems, devices, articles, and methods with practical application in information processing (e.g., computing, communication, quantum computing, and quantum communication). Information processing includes processing information where information is stored in the physical state of a physical (e.g., tangible) system. Communication includes transferring information from one physical system to another physical system by one or more signals which describe the physical state of a physical system. Quantum information processing includes processing information by using one or more quantum physical effects, such as, superposition, coherence, decoherence, entanglement, nonlocality, and teleportation. Some implementations of the present systems, devices, articles, and methods include, or are characterized by, two or more of the following aspects of a quantum computer: well-defined qubits, reliable state preparation, low decoherence rates, accurate quantum gate operations, multi-qubit operations, and quantum measurements. The systems, devices, articles and methods, with practical application in quantum communication and quantum computing, can interconvert states in stationary qubits (e.g., solid state) and flying qubits (e.g., photons).

Some implementations of the present systems, devices, articles, and methods include, or are characterized by, information being stored in, or manipulated by energy differences, associated with spin-valley-orbital states of one or more defects (e.g., deep-level defects, point defects, deep donors) in a body(ies) of semiconductor material, e.g., silicon, or a material that principally comprises silicon.

Figure 1:
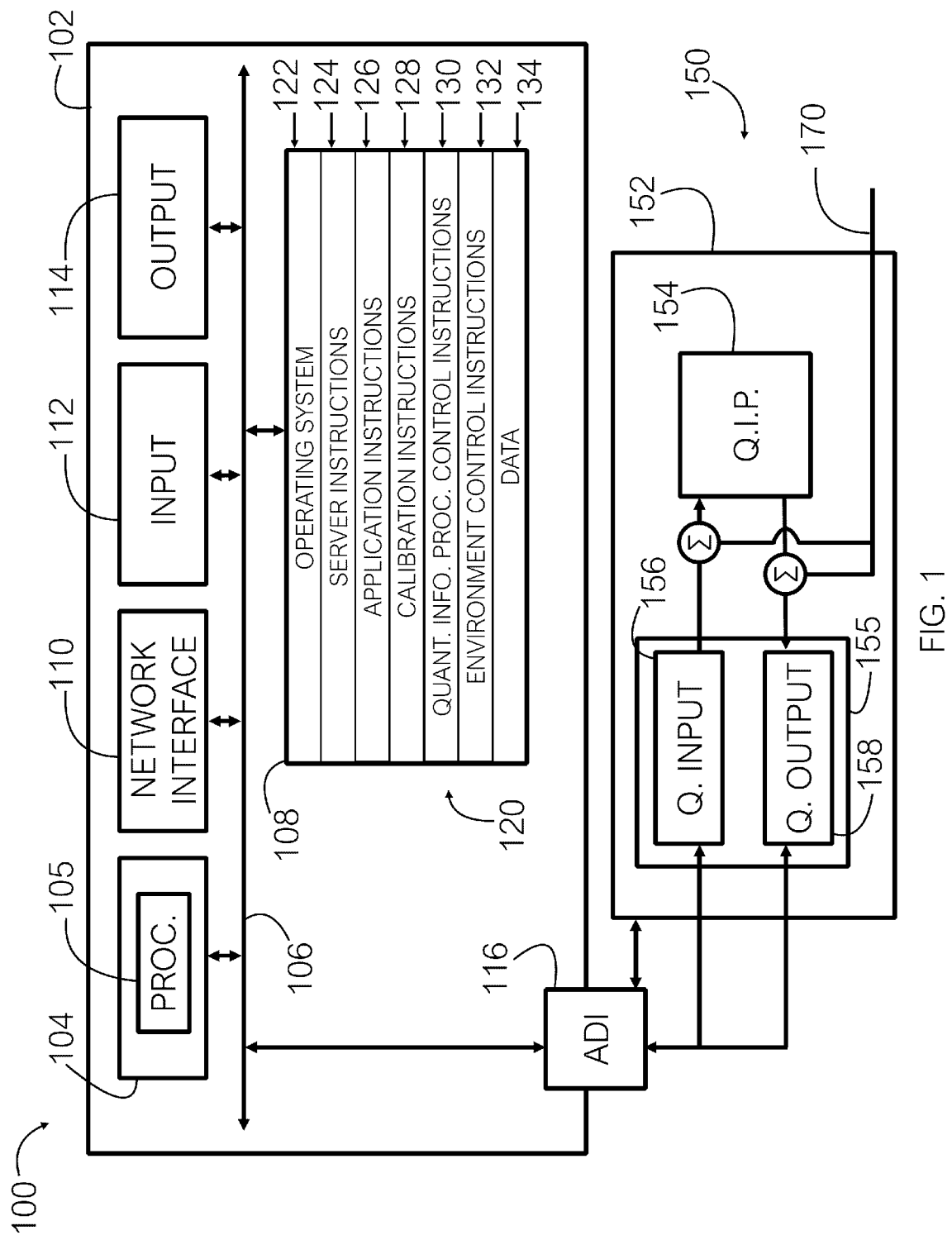
FIG. 1 is a schematic diagram illustrating a portion of a system including a quantum information processor.

FIG. 1 illustrates a processor-based system 100 including one or more specialized devices to process information. System 100 includes a digital computer 102 that comprises a control subsystem 104. Control subsystem 104 includes at least one processor 105. Digital computer 102 includes at least one bus 106 coupled to control subsystem 104. System 100 further includes at least one non-transitory computer- and processor-readable storage device 108, and a network interface subsystem 110, both communicatively coupled to bus(es) 106. Digital computer 102 includes an operator input subsystem 112, and an output subsystem 114, communicatively coupled to the bus(es) 106. Digital computer 102 also includes an analog device interface (ADI) subsystem 116 coupled to bus(es) 106. Bus(es) 106 may communicatively couple two or more subsystems in computer 102. In some implementations, some subsystems of system 100 may be omitted or combined. Some subsystem of system 100 may be remotely accessed via network interface subsystem 110.

The at least one processor 105 may be any logic processing unit, such as one or more digital processors, microprocessors, central processing units (CPUs), graphics processing units (CPUs), application-specific integrated circuits (ASICs), programmable gate arrays (PGAs), programmed logic units (PLUs), digital signal processors (DSPs), network processors (NPs), and the like.

Network interface subsystem 110 includes communication circuitry to support bidirectional communication of processor-readable data, and processor-executable instructions. Network interface subsystem 110 may employ communication protocols (e.g., FTP, HTTPS, SSH, TCP/IP, SOAP plus XML) to exchange processor-readable data, and processor-executable instructions over a network or non-network communication channel (not shown) such as, Internet, a serial connection, a parallel connection, ETHERNET®, wireless connection, fiber optic connection, combinations of the preceding, and the like.

Operator input subsystem 112 includes one or more user interface devices such as keyboard, pointer, number pad, touch screen, or other interface devices for a user or human operator. In some implementations, operator input subsystem 112 includes one or more sensors for digital computer 102 or analog device 150. The one or more sensors provide information characterizing or representing the environment or internal state of digital computer 102 and/or analog device 150. Further, output subsystem 114 includes one or more user interface devices such as, display, lights, speaker, and printer.

Storage device(s) 108 include at least one non-transitory or tangible storage device. Storage device(s) 108 can, for example, include one or more volatile storage devices, for instance random access memory (RAM); and one or more non-volatile storage devices, for instance read only memory (ROM). The storage device(s) 108 may comprise solid state memory, flash memory, magnetic hard disk, optical disk, solid state disk (SSD), hard disk drive (HDD), network drive, other forms of computer- and processor-readable storage media, or a combination thereof. A person of ordinary skill in the art will appreciate that storage device(s) 108 may be implemented in a variety of ways, such as, non-volatile storage, volatile storage, and/or a combination thereof. Further, computer systems can conflate volatile storage and non-volatile storage, for example, caches, solid-state hard drives, in-memory databases, and the like.

Storage device(s) 108 includes or stores processor-executable instructions and/or processor-readable data 120 associated with the operation of system 100. Executing processor-executable instructions 120, and, optionally, reading processor-readable data 120 causes the at least one processor 105, and/or control subsystem 104, to carry out, or cause, various methods and actions to be performed by system 100, digital computer 102, other systems or devices, or a combination. For example, through network interface subsystem 110, or ADI subsystem 116. Processor-executable instructions and/or processor-readable data 120 can, for example, include a basic input/output system (BIOS) (not shown), an operating system 122, peripheral drivers (not shown), server instructions 124, application instructions 126, calibration instructions 128, special information processor control instructions 130, environment instructions 132, and data 134. A portion of storage device(s) 108, or processor-executable instructions and/or processor-readable data 120 may be included in an articling of manufacture comprising a non-transitory processor readable storage device.

Exemplary operating system 122 includes, for example, LINUX®, and WINDOWS® operating systems. Server instructions 124 include processor-executable instructions and/or processor-readable data to interact with processor-based devices external to system 100 across a network through network interface subsystem 110. In some implementations, processor-executable server instructions 124 include processor-executable instructions and/or processor-readable data that, when executed by a processor, schedules jobs for digital computer 102 or analog device 150. Application instructions 126 include processor-executable instructions that, when executed, cause system 100 to perform one or more actions associated with an application, e.g., perform computations on digital computer 102 or analog device 150.

Calibration instructions 128 include processor-executable instructions, that, when executed by a processor (e.g., processor(s) 105) cause the processor to calibrate and store the calibrated values for analog device 150. Components included in or on analog device 150 could have inter-component variation in operating parameters. Variation in operating parameters may vary with time or vary from expected or ideal component parameters. Calibration instructions 128, when executed by a processor, allow for test and correction of these inter-component variation, temporal variation, and/or variation from expected or ideal component parameters.

Special information processor control instructions 130 include processor-executable instructions that, when executed by a processor (e.g., processor(s) 105), cause the processor to control, initialize, write to, manipulate, read out, and/or otherwise send data to/from analog device 150. Special information processor control instructions 130 implement, in part, the methods described herein (e.g., with reference to FIGS. 10 through 15) and/or make use of control subsystem included in analog device 150.

Environment instructions 132 include processor-executable instructions and/or processor-readable data, that, when executed by a processor (e.g., processor(s) 105), cause the processor to control and monitor aspects of prescribed and possibly specialized environments for part or all of analog device 150. Examples of environment instructions 132 include instructions which when executed monitor and control temperature and/or magnetic field affecting special information processor 154.

Environment instructions 132 could create a thermal profile (e.g., temperature values for some or all of analog device 150 with temporal or spatial dependencies). Environment instructions 132 implement, in part, the methods described herein, including those in and in relation to FIG. 10.

Data 134 may include processor-readable information or data used, obtained, created, or updated by the operation of system 100. For example, one or more logs from digital computer 102 and analog device 150. Data 134 may include processor-readable data comprising parameters for the operation of system 100. Data 134 may include processor-readable data associated with (e.g., created by, referred to, changed by) a processor executing processor-executable instructions, such as, server instructions 124, application instructions 126, calibration instructions 128, special information processor control instructions 130, and environment instructions 132. Data 134 may include processor-readable data corresponding to energy states (e.g. local degrees of freedom) associated with defects (e.g., luminescent defect, deep defect) and modified by a local degree of freedom (e.g., spin, valley splitting), or transitions (e.g. energy differences) between such states. Examples of such data are shown herein at, at least, FIG. 3A.

Analog device interface (ADI) subsystem 116 includes communication circuitry that supports bidirectional communication between digital computer 102 and analog device 150. In some implementations, the input or output from analog device 150 is digital an intermediate state within analog computer is analog. In some implementations, ADI subsystem 116 interacts with an environment subsystem 152 of analog device 150. In some implementations, ADI subsystem 116 interacts with special information processor 154 through one or more subsystems of analog device 150 (e.g., subsystems 155, 156 and 158). In various implementations, ADI subsystem 116 may include a waveform digitizer (e.g., an ALAZARTECH ATS9440, a 4-channel, 14 bit, 125 MS/s card, or an ALAZARTECH ATS9360, a 1-channel, 12 bit, 1.8 GS/s PCI card, card from Alazar Technologies Inc. of Pointe-Claire, QC, CA), an infrared photon detector (e.g., a SINGLE QUANTUM EOS Multi-channel SNSPD photon detector from Single Quantum, Delft, ZH, NL, or an ID230 NIR photon detector from ID Quantique SA, Carouge, GE, CH). Further detectors are described herein at, at least, FIG. 2.

Analog device 150 includes an environment subsystem 152, which in response to execution of the environment instructions 132, provides a prescribed environment for special information processor 154. Aspects of a prescribed environment may include, for example, one or more of moisture, air pressure, vibration, magnetic field, temperature, and electromagnetic fields. In some implementations, environment subsystem 152 provides a low magnetic field around special information processor 154. In some implementations, environment subsystem 152 provides a time invariant magnetic field around information processor 154. In some implementations, environment subsystem 152 provides a time varying or pulsed magnetic field. In some implementations, environment subsystem 152 maintains the information processor 154 at cryogenic temperatures by one or more refrigeration units, and/or cold sources. For example, information processor 154 may be maintained near 4 K. Other useful temperatures for information processor 154 include temperatures in a range from about 1 mK to about 77 K. In some implementations, environment subsystem 152 maintain processor 154 in a range from about 1.5 K to about 4 K. In some implementations, environment subsystem 152 maintains the environment around information processor 154 at a temperature of about 290 K. In some implementations, environment subsystem 152 includes vibration isolation components, such as, dampeners in refrigeration units. In some implementations, environment subsystem 152 provides a low moisture and constant air pressure (e.g., a stable vacuum) environment to special information processor 154.

Special information processor 154 may be a quantum device. Quantum devices are manufactures or structures in which quantum mechanical effects are noticeable and/or dominate. Quantum devices (such as, superconducting circuits and spintronic circuits) include circuits in which current transport is dominated by quantum mechanisms. Superconducting circuits use quantum physics phenomena such as tunneling and flux quantization. Spintronic circuits use the physical property of spin (e.g. electron spin) as a resource to receive, process, store, send, or output information. Quantum devices can be used for measurement instruments, in computing machinery, and the like. Examples of computing machinery include components of classical computers and quantum computers.

Information processor 154 may be a quantum information processor which includes one or more qubits or qudits, collectively qubits. A qubit or quantum bit is a logical building block of a quantum computer comparable to a binary digit in a classical digital computer. A qubit conventionally is a defined physical system having two or more discrete states called computational states. Computational states, examples of which are described herein, are analogous to binary states (i.e., 0 and 1) and may be labeled |0⟩ and |1⟩. In some implementations, these states are the eigenstates of a sigma-Z operator (Pauli matrix operator) for the Hamiltonian of the physical system. Such qubits are said to be in the Z diagonal basis and other bases may be used without loss of generality. A qubit may be in a superposition of states or linear combination, e.g., $\alpha|0\rangle + \beta|1\rangle$. Coefficients $\alpha$ and $\beta$ may be complex numbers and have the sum of their modulus sum to one. One or more logical operations can be performed on one or more qubits. These operations can occur at a prescribed time (e.g., at a specified time) or at a frequency for a prescribed period. In some implementations, information processor 154 includes one of more qudits. A qudit is a generalization of a qubit that has three or more computational states, e.g., |0⟩, |1⟩, |2⟩, and perhaps further states up to the dimensionality of the qudit. In some implementations, information processor 154 includes one of more qutrits. A qutrit is a 3-tuple version of a qubit. A person having ordinary skill in the art will appreciate that qubit may be used as a synecdoche where the species "qubit" stands for the genus "qudit".

In some implementations, information processor 154 includes one or more components, devices, or subsystems to perform one or more types of single qubit operations on one or more qubits. Examples of single qubit operations include the sigma-X or bit flip operation, comparable to a classical NOT gate. A sigma-X operation effects a rotation of a quantum state modelled as a Bloch sphere around the X-axis. When the rotation is $\pi$ radians, state |0⟩ is mapped to |1⟩ and vice versa, i.e., a full bit flip. Some examples of information processor 154 perform on one or more qubits a sigma-Y operation, having no classical binary counterpart. A sigma-Y operation effects a rotation around the Y-axis of the Bloch sphere. If the rotation is $\pi$ radians the operation maps state |0⟩ to i|1⟩ and state |1⟩ to −i|0⟩. The sigma-Y operation is sometimes called a Pauli-Y operation or gate. Information processor 154 may perform on one or more qubits a sigma-Z, or phase operation, having no classical counterpart. A sigma-Z operation effects a rotation around the Z-axis of the Bloch sphere. If the rotation is $\pi$ radians the operation maps |0⟩ to |0⟩ and |1⟩ to −|1⟩. The sigma-Z operation is sometimes called a phase-flip operation or gate. Examples of implementations of sigma-X, sigma-Y, and sigma-Z operations are described herein at least with reference to FIG. 13.

In some implementations, information processor 154 includes one or more couplers that can couple qubits. This is a two-qubit operation that may be a selective operation. A two-qubit operation may be performed on a first and a second qubit. An example two-qubit operation is a CNOT gate where two qubits are taken as input and the output state of a first qubit is the NOT of the first qubit's input state conditional on the state of the second qubit's input state. A second example two-qubit operation is a CPHASE gate where two qubits are taken as input and the output state is altered by a phase factor $e^{i\varphi}$ if the two input qubits are in state |11⟩. The three other inputs (|00⟩, |01⟩, and |10⟩) remain unaffected. A third example of a two-qubit operation is an (sing operation, or sigma-Z operation.

In information processor 154, qubits can be communicatively coupled to one another through a number of structures and devices. In some implementations, multi-qubit interactions are mediated, for example, by a single coupler included in information processor 154. In some implementations, the multi-qubit interactions can be obtained by direct resonance coupling of the structures and devices involved without a need for couplers. For example, driving two qubits at or near resonance to effect direct resonance interaction. Information processor 154 may effect multi-qubit interactions by executing processor-executable instructions and in response to the execution bring two or more qubits on, or nearly, on resonance with each other, e.g., the two or more qubits are neighbours and interact at the same frequency. In some implementations, multi-qubit interactions are mediated by multiple couplers. The information processor 154 includes as couplers one or more optical structures. The information processor 154 may include as couplers one or more optical resonators, and/or one or more waveguides. Examples of implementations of multi-qubit operations are described herein at least with reference to FIG. 14. In some implementations, information processor 154 includes one or more qubits absent of associate couplers.

Analog device 150 includes a control subsystem 155. The control subsystem may include an input system 156, an output system 158, or both. The special information processor input subsystem 156, in response to processor-executable instructions, write to information processor 154, or manipulate information stored therein. The input subsystem 156 may be formed on the same substrate as information processor 154, physically coupled to information processor 154, communicatively coupled to information processor 154, or a mix of the preceding. In some implementations, input subsystem 156 includes a digital to analog converter. The input subsystem 156 may include one or more of an optical input subsystem, electric field subsystem, magnetic manipulation subsystem, mechanical subsystem, cryogenic subsystem, associated or included components, and the like. Examples of subsystems are described herein with reference to, at least, FIG. 2.

The input subsystem 156 may encode processor-readable information, including classical and quantum information, and transfer that information to information processor 154. The input subsystem 156 may include a light source to apply narrow or broad spectrum light (e.g., pulsed light) to parts of special information processor 154. In some implementations, input subsystem 156 includes an electromagnet to provide a magnetic field to parts or all of information processor 154. In some implementations, input subsystem 156 includes one or more emitters (e.g., wires, antennae, coils) to selectively provide control pulses for one or more times, durations, and frequencies to information processor 154. Example of a pulse generator is a PSPL10070 A™ generator available from Tektronix, Inc. of Beaverton, OR, US. In some implementations, the emitters are on information processor 154. In some implementations, the emitters are proximate to information processor 154 and coupled to components or devices on it. Microwave, radio frequency (RF), and/or electromagnetic control pulses may be used. In some implementations, input subsystem 156 in conjunction with control subsystem 104 is used to perform electron paramagnetic resonance (EPR) and/or nuclear magnetic resonance (NMR) on electronic and/or nuclear spins in input subsystem 156. In some implementations, a bulk EPR or NMR cavity surrounds information processor 154.

Analog device 150, shown in FIG. 1, includes a special information processor output subsystem 158 to, at least, read from information processor 154. Output subsystem 158 may be formed on the same substrate as information processor 154, physically coupled to information processor 154, communicatively coupled to information processor 154, or a mix of the proceeding. In some implementations, output subsystem 158 includes one or more of an analog to digital converter(s), amplifier(s), filter(s), and the like. In some implementations, output subsystem 158 includes an optical readout device or devices. An optical readout device (e.g., a photodetector) detects photons produced by, or in, information processor 154 or measures the state of an optical structure included on, or in, information processor 154.

An optical structure, such as a resonator, supports one or more photonic modes. Examples of optical structures are described herein. In some implementations, optical readout device(s) distinguishes between the presence, and absence, of one or more photons in the optical resonator. In some examples, optical readout device(s) detects a frequency shift for one or more photonic modes of an optical structure. One optical readout device may readout the state of one or more optical resonators. The state of an optical structure can be dependent on the occupation of a particular state of a defect, such as, a deep donor or luminescent defect, coupled to the optical structure. A particular state includes spin-valley-orbital state. Examples of defects are described herein.

In some implementations, output subsystem 158 includes one or more photo detector(s) such as HgCdTe (MCT) variable band gap detector, e.g., a PVI-4TE-λopt™ VIGO System S.A., Ożarów Mazowiecki, MZ, PL photodetector from, or a SINGLE QUANTUM EOS Multi-channel SNSPD photon detector, Single Quantum, Delft, NL, or an ID230 NIR photon detector from ID Quantique SA, Carouge, GE, CH.

In some implementations, output subsystem 158 includes one or more photo detector(s) such as APD110C or PDA20CS2 InGaAs Avalanche photodetectors available from Thorlabs Canada ULC, Saint-Laurence, QC, CA; superconducting on chip photon detector described in Akhlaghi et al., 2015 *Nature Communications* 6: 8233; various detectors described in Eisaman, et al., 2011 *Rev. Sci. Instrum.* 82, 071101; or ADN3010-11 detector from Analog Devices, Inc. of Norwood, MA, US.

In some implementations, digital computer 102 uses output subsystem 158 to perform logical operations on information in information processor 154. For example, output subsystem 158 may be used to perform measurements on quantum states stored in or on information processor 154. In some implementations, including a strong quantum measurement device, such as, examples described herein with reference to at least FIG. 6A, measurements can replace one or more quantum operations. Universal quantum computing can be accomplished using only local gates and nonlocal (e.g., parity or multi-qubit) measurements.

A multi-qubit measurement relates to observation of a collective, group, or aggregate property of a plurality of qubits, e.g., plurality of qubits defined in information processor 154. Processor(s) 105, and/or control subsystem 104 may perform many methods in information processing that include a multi-qubit measurement readout of an aggregate property of the plurality of qubits. These methods include: quantum error correction (e.g., surface codes), quantum phase estimation, multi-qubit operations, and entanglement generation. The aggregate property of the plurality of qubits could include the parity of the qubits. Here even parity includes a balanced state, such as, an equal number of two computational states, and odd parity an unbalanced state, such as, an uneven number. Odd parity often implies an error syndrome akin to classical error detection codes based on repetition of redundant information.

As an example, in the Z basis with four qubits the following states are even parity: $|0000\rangle$, $|0011\rangle$, $|0110\rangle$, or the like. However, in the X basis where $|+\rangle=(|0\rangle+|1\rangle)/\sqrt{2}$ and $|-\rangle=(|0\rangle-|1\rangle)/\sqrt{2}$ the even parity states include $|----\rangle$, $|++--\rangle$, $|-+++\rangle$, or the like. Other parity states can be defined for other bases and/or for other aggregate properties of the plurality of qubits. Examples of parity measurements are described herein with reference to at least FIG. 10 and FIG. 12.

In some implementations, output subsystem 158 performs single shot readout on the state of components in information processor 154. In some implementations, output subsystem 158 performs readout on the state of components in information processor 154 at gigahertz speed.

In some implementations, output subsystem 158 receives (e.g., receives, requests and receives) quantum non-demolition measurement readout results on the state of components in information processor 154. In some implementations, output subsystem 158 performs readout on the state of one or more ancillary photons that have interacted with at least one component in information processor 154. Examples of quantum non-demolition measurement are described herein with reference to at least FIG. 6B. Examples of measure of one or more ancillary photons are described herein with reference to at least FIGS. 6A and 6B.

In some implementations, analog device 150 is communicatively coupled to a communication channel 170. Channel 170 can be used to send information (e.g., quantum information, classical information) to and from information processor 154. Channel 170 may communicatively couple information processor 154 and one or more information processors, such as, a second instance of information processor 154. Channel 170 may communicatively couple information processor 154 to another device, such as a photon generator.

In some implementations, portions of digital computer 102 and analog device 150 are omitted to create a smaller information processing device including information processor 154, and channel 170. In some implementations, portions of digital computer 102 or analog device 150 are a communication device.

Figure 2:
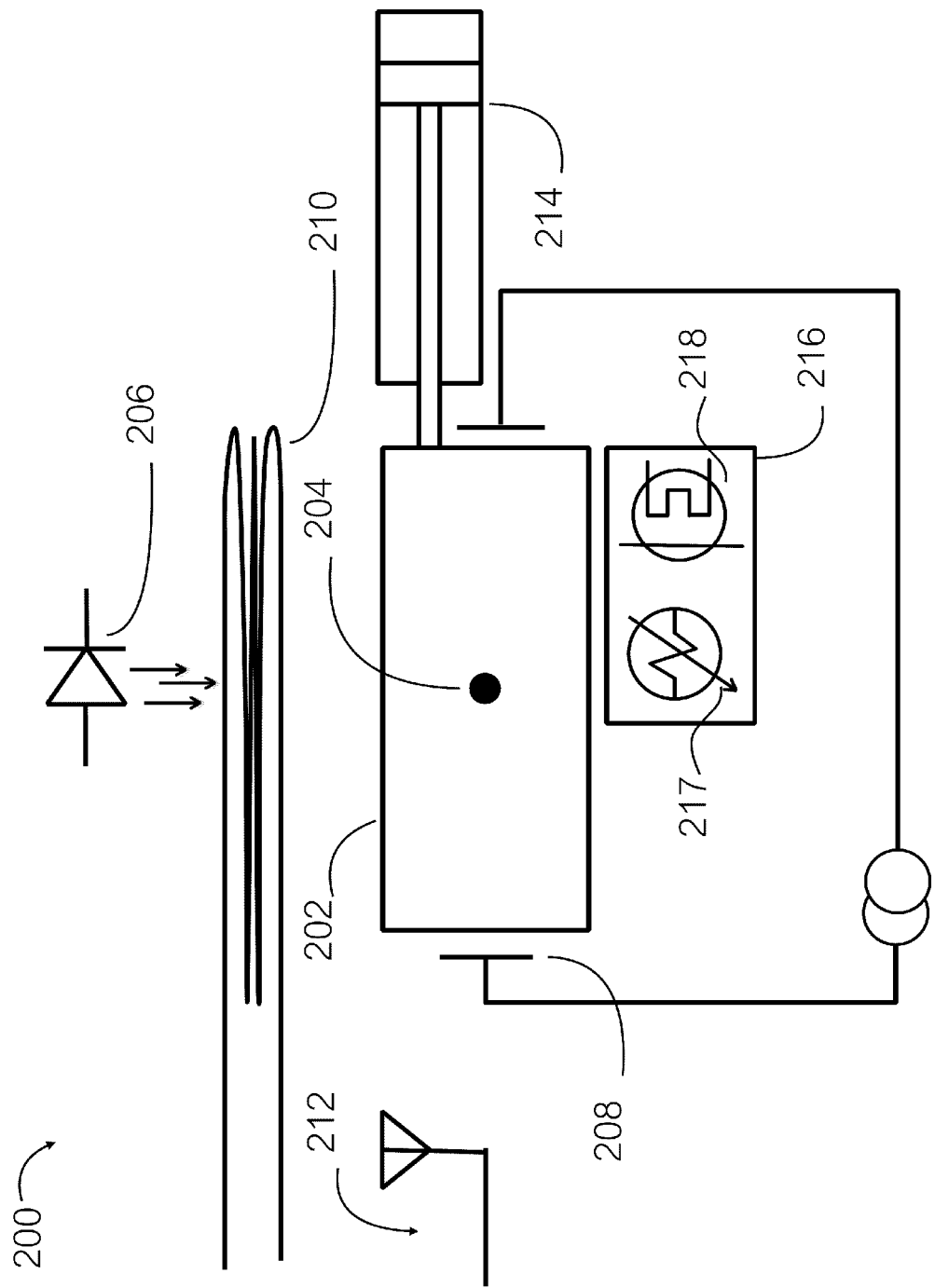
FIG. 2 is a schematic diagram illustrating an example defect and a semiconductor body.

FIG. 2 is a schematic diagram illustrating a part of a device 200. The illustrated part of device 200 includes a substrate of semiconductor material, body of semiconductor material, or semiconductor body 202, and an exemplary defect 204 disposed (e.g., created, formed, implanted, located, placed, situated) within the semiconductor material 202. Device 200 may be operated as an information processor, e.g., quantum information processor, optical processor, optical device, and communication device.

In some implementations, semiconductor material 202 includes silicon. Semiconductor material 202 can include natural silicon. Semiconductor material 202 can include other substances like silicon carbide or silicon germanium. In some implementations, semiconductor material 202 includes purified silicon, or a so-called silicon vacuum. One way to increase performance metrics for a physical system (e.g., longer coherence time for a system such as device 200) is to use a semiconductor material processed to remove a large fraction of non-paramagnetic isotopes (e.g., silicon-29) that broaden spectroscopic measurements. Enriched or purified silicon has been processed to remove some to nearly all non-zero-nuclear spin isotopes, such as, silicon-29. Purified silicon includes material enriched to various levels of silicon-28, such as, 99%, 99.9%, and 99.99%. Purified silicon includes material enriched with silicon-28. Purified silicon includes silicon where spectroscopic linewidths are at least ten to hundred times sharper than in natural silicon.

A semiconductor body consisting principally of purified silicon can be produced or purchased. Production techniques include using, as an input material, purified silicon compound (e.g., by isotope, by magnetic properties) created by enrichment methods like gas centrifuge (e.g., silicon tetrafluoride), magnetic mass separation, or ion exchange. Purified gaseous silicon compounds may be part of purification or production process. Such compounds include purified silicon tetrafluoride ($SiF_4$), or purified silane ($SiH_4$). Bodies, crystals, substrates, and wafers including purified silicon may be created using, amongst other methods, molecular beam epitaxy (MBE), and chemical vapor deposition (CVD). Available isotopically purified silicon includes removing silicon-29 to levels of tens, hundreds, thousands, or tens of thousands of parts per million. Suitable semiconductor material 202 may be purchased from Isoflex USA, an isotope supply company, of San Francisco, CA, US.

In some implementations, semiconductor material 202 is an epilayer of isotopically purified silicon, grown on top of a natural silicon wafer. The semiconductor material 202 may be on the order of a micrometer thick while the natural silicon wafer may be up to on the order of a millimeter thick. In some implementations, the semiconductor material 202 is a thin layer of silicon, grown or deposited on top of a body including insulating material such as silicon oxide, sapphire, silicon nitride, and the like. Here silicon can refer to natural silicon, purified silicon, or a silicon alloy such as a silicon-germanium blend, whose constituent components may be isotopically purified.

Defect 204 is disposed within the bulk of semiconductor material 202. The body of semiconductor material 202 is defined by a plurality of interfaces (e.g., faces, side, or edges). Defect 204 is, in some implementations, disposed deep or far within the bulk or mass of semiconductor material 202. In at least one implementation, defect 204 is disposed at a shallow or near interface, e.g., distance equal to or less than 10 nanometers from an interface of the plurality of interfaces. In some implementations, defect 204 is disposed at a distance greater than 10 nanometers from an interface of the plurality of interfaces. In some implementations, defect 204 is evanescently coupled to an optical structure (e.g., resonator, waveguide, lens; not shown in FIG. 2). In some implementations, defect 204 is disposed at a distance greater than 10 nanometers from each interface of the plurality of interfaces. In some implementations, defect 204 is evanescently coupled to an optical structure (e.g., resonator, waveguide, lens). In some implementations, defect 204 is disposed at a distance greater than 20 nanometers from each interface of the plurality of interfaces. In some implementations, defect 204 is disposed at a distance greater than 30 nanometers from each interface of the plurality of interfaces. In some implementations, defect 204 is disposed at a distance between 30 and 500 nanometers from an interface of the plurality of interfaces. In some implementations, defect 204 is disposed at a distance between 10 nanometers and 2 microns from an interface for semiconductor material 202. Defect 204 may be disposed at a distance between 30 nanometers and 1 micron from each interface. The further defect 204 is into body 202, the further defect 204 is away from charges that may reside on the interfaces of the body of semiconductor material 202.

Defect 204, and like pluralities, may be formed out of one or more atoms or atomic vacancies (e.g. omitted silicon atoms), and these atoms locally occupy one or more reproducible specific relative positions to one another and to the lattice of semiconductor material 202.

The crystalline pattern of silicon atoms may permit a type of defect, defined by its chemical composition and configuration, to have a number of distinct equivalent orientations relative to the lattice, however these distinct orientations are still attributed to the same defect type. The type of defect and implantation method vary with implementation. Silicon industry standard techniques of ion implantation may be used to controllably implant the constituent components of the luminescent defect 204 into semiconductor material 202. One implanting process is described in U.S. Pat. No. 3,434,894. In some implementations, defect 204 is a stable, non-gaseous, chalcogen atom. That is, long lived, metallic and non-metallic solids, group 16 atoms with a substitutional double-donor electronic structure in silicon. Examples include sulfur, selenium, and tellurium. In some implementations, particular isotopes of the group 16 atoms are used. Examples include sulfur-33, selenium-77, tellurium-123, and tellurium-125. Suitable isotopes may be purchased from Isoflex USA.

In some implementations, defect 204 is a "deep-level defect", "deep-level impurity", or "deep-level donor" with an ionization energy that is substantially greater than the thermal energy, $k_BT$, where $k_B$ is Boltzmann's constant and the temperature T is the room temperature (~293 K). A shallow donor's energy is comparable to the thermal energy at room temperature. Herein "shallow" and "deep" are used in two senses: one, to qualify an energy of one or more defects (e.g., donor atoms); and two, to qualify a spatial location of one or more donor atoms. To a person of ordinary skill in the art these different meanings are apparent in each individual appearance especially in light of context, such as, "energy", "level", "spectra" versus "dispose", "place", "location", and the like.

In some implementations, device 200 includes a defect 204 disposed within the semiconductor material 202. Defect 204 may be a local, localized, or point defect in semiconductor material 202, e.g., silicon lattice. Local may refer to a defect whose atomic constituents or configuration differs from that of pure semiconductor across distances less than 5, 3, or 2 unit cell lengths, where the lattice constants of an undamaged lattice defines a cell length. For example, at least one interstitial silicon atom and/or at least one vacancy (the absence of a silicon atom) can define a defect. A defect may cause distortions (e.g. strain) in neighbouring cells beyond the size of the defect. A defect may support electronic, or hole wavefunctions which extend beyond the size of the defect as defined by its atomic constituents or configuration.

Defect 204, or pluralities of the same, may be a local defect or point defect. In some implementations, defect 204 is a substitutional defect, a lattice site in semiconductor material 202 contains a different atom than found in the neighbouring lattice sites. Defect 204 may be a vacancy; an empty lattice site which would be occupied in a crystal. In some implementations, defect 204 is an interstitial defect where an atom occupies a non-lattice site. An example of an interstitial defect is the Al1 (aluminum one) defect (836 meV, 6742.8 $cm^{-1}$, near IR). Defect 204 may be a Frenkel defect where an atom moves into an interstitial site and creates a vacancy. That is, a combination of interstitial and vacancy defects. Here atom includes at least one atom, ion, or molecule but the defect remains local.

Defect 204, or pluralities of the same, may be a damage centre, such as, a radiation damage centres. Defect 204 in semiconductor material 202 may be constructed by one of a plurality of methods. One class of methods includes applying radiation to semiconductor material 202. In some implementations, applying an electron beam to semiconductor material 202 creates defect 204. Applying radiation may be followed by annealing the semiconductor material 202 at prescribed temperatures. For example, treating a silicon body with an electron beam and annealing near 100° C. creates a G-centre. Temperatures vary by defect, for example, a method for creating a T-centre may include annealing at 450° C. Defect 204 may be formed from implanting carbon into semiconductor material 202. In some implementations, defect 204 is constructed by implanting electrons, neutrons, protons, or silicon or other atoms into semiconductor material 202 pre-contaminated with carbon.

Semiconductor material 202 may be a wafer including silicon. The wafer may be a silicon-on-insulator wafer such as a 220 nm thick wafer overlying silicon dioxide insulator. The silicon may be extrinsic silicon doped with substitutional donor or acceptors. The wafer is subjected to a beam of carbon ions with a beam energy between 5 and 100 keV (e.g., 20 keV, 30 keV, 40 keV). The wafer can be treated with further carbon ions at same or different energies (e.g., lower energy).

Optionally the semiconductor material 202 may be annealed to repair damage during ion implantation. For example, semiconductor material 202 may be heated by furnace, heater, lamp, or laser to a high-temperature (e.g., near or over 1,000° C.) on a timescale of several seconds to a few minutes. Semiconductor material 202 is cooled at a slow rate to prevent effects of thermal shock (e.g., breakage). The Rapid Thermal Anneal (RTA) and Rapid Thermal Processing (RTP) in semiconductor manufacturing are applicable. The semiconductor material 202 can be implanted with protons with a beam at two orders of magnitude higher than carbon ions, e.g., at 2 MeV.

In some implementations, defect 204 is a "luminescent defect" which may also be labelled a "luminescent impurity", "luminescent acceptor", or "luminescent donor" in an appropriate context. luminescent defects include a pair of energy states where the decay process from the first state of the first pair of energy states to the second state of the first pair of energy states has a sufficient characteristic probability (e.g. 0.1%) of generating at least one optical photon. The characteristic probability of emitting at least one optical photon is the likelihood of optical photon emission from defect 204 when located in the bulk of an unstrained semiconductor body 202.

The probability of optical photon emission from defect 204 when not in a bulk-like strain-free semiconductor environment can differ substantially from its characteristic optical photon emission probability through effects such as the Purcell Effect which can influence the local density of states. An optical photon is a photon with wavelength in the ultraviolet (UV), visible (VIS), or infrared (IR) bands, that is, wavelengths between about 10 nm and 100 μm.

Defect 204 may have a pair of energy states where the decay process from a first state of the first pair of energy states to a second state of the pair of energy states has sufficient photon generation probability of generating one optical photon and no phonons (e.g. quantized quasiparticles of vibrational energy). The transition energy of the optical photon is called a Zero Phonon Line (ZPL) transition energy.

Defect 204 can be of a type defined by its chemical composition and configuration and/or by physical property like a characteristic optical photon energy such as ZPL transition energy. The characteristic optical photon energies and typical photon generation probabilities of a defect can be modified by constituent atomic isotopes and/or the environment of the luminescent defect including but not limited to temperature, strain, pressure, electromagnetic fields, or the like. To a person skilled in the art it is clear that the characteristic transition energy and/or photon generation probability of a type of luminescent defect modified by the environment and/or isotopic composition of the luminescent defect does not constitute a distinct type of luminescent defect. The optical transition may be affected by a splitting as described herein.

In some implementations, device 200 includes one or more deep-level defects (e.g., deep donor atoms) with an optical transition. An exemplary deep-level defect is a non-gaseous stable chalcogen atom. Defect 204 may have a nonzero nuclear spin, for example, some chalcogen nuclear isotopes have a nonzero spin, such as, 33S (spin-3/2), 77Se (spin-1/2) and 123Te and 125Te (both spin-1/2). These deep donors include ground states that have the same spin Hamiltonian as Group V (Group 15) donors, but with much larger hyperfine constants of about 312 MHz, 1.66 GHz, 2.90 GHz, and 3.50 GHz respectively.

In some implementations, device 200 includes as a defect 204 a double donor. When singly-ionized, a double donor has even larger binding energy (614 meV for S+, 593 meV for Se+, and 411 meV for Te+), and a hydrogenic (or He+) orbit structure with optical transitions in the mid-infrared ('mid-IR'). In 28Si:77Se+ the optical transitions between the ground spin states to the lowest excited state are sufficiently narrow to be spin selective even at low, very low, or zero magnetic field.

Examples of non-gaseous stable chalcogen atoms include neutral, ionized, and doubly ionized atoms, e.g., $S^0$ (~300 meV), $Se^0$ (~300 meV), $Te^0$ (~300 meV), $Se^+$ (593 meV), $S^+$ (614 meV), $Se^+$ (593 meV), $Te^+$ (411 meV), $S^{++}$, $Se^{++}$, and $Te^{++}$. Just as singly-ionized charge state of deep donors can couple to optical structures, neutral (e.g., uncharged) deep double donors also admit suitably narrow optical transitions to excited states, and these transitions are similarly able to couple strongly to optical structures. Doubly-ionized atoms can be employed as nuclear spin qubits and proximate optical structures can interact with a doubly-ionized charge state. In some implementations, only one particular charge state is used to define qubits. In some implementations, one or more computational states in a qubit include a plurality of charge states.

Examples of deep-level defects include deep impurities. Examples of deep impurities includes metallic clusters, such as, clusters of four atoms, e.g., $Cu_4$ (1014 meV), $Cu_3Ag$ (944 meV), $Cu_2Ag_2$ (867 meV), $Cu_3Pt$ (884 meV), $Cu_3Pt$ (882.36 meV), $Cu_2LiPt$ (850.1 meV), $CuLi_2Pt$ (827.6 meV), $Li_3Pt$ (814.9 meV), $Ag_4$ (778 meV), $Li_3Au$ (765.3 meV), $CuLi_2Au$ (746.7 meV), $Cu_3Au$ (735 meV), and $Cu_2LiAu$ (735.2 meV). Here the energies are transition energies and not the binding energies. Examples of deep impurities include a metallic cluster, such as, clusters of five atoms, e.g., $CuLi_3$(Au) (1090.2 meV), $Cu_4Au$ (1066 meV), $Cu_3LiAu$ (1052.7 meV), $CuLi_2Ag$ (909.9 meV), $Cu_4Pt$ (777 meV), Cu2Li2Pt (694.6 meV), $Cu_3LiPt$ (725.6 meV), and $CuLi_3Pt$ (671.6 meV).

Examples of deep defects include metallic atoms or metallic clusters selected from transition metals, e.g., clusters including copper, silver, gold, or platinum. In some implementations, a transition metal is a metal from the d-block or Groups 3 to 12 on the periodic table. In some implementations, a transition metal includes a metal selected from the f-block or lanthanide and actinide series.

Examples of deep-level defects include Group I and II (Group 1 and 2) atoms or clusters, such as, a Group 2 double donor, e.g., $Mg^+$ (256.5 meV), $Mg^0$ (107.5 meV), and Be, or a Group 1 donor, e.g., $Li^0$ and $Li^+$. Examples of defects include compounds and cluster including those described herein above. Examples of defects include sulfur and copper, for example, the so called $S_A$ (968 meV) and $S_B$ (812 meV) centers.

In some implementations, device 200 includes one or more defects with an optical transition. In some implementations, defect 204 has a luminescence near 1570 nm (0.789 eV, 6364 cm$^{-1}$) in the so called L-band (1565-1625 nm). The L-band is one of five named telecommunication bands covering 1260 nm to 1625 nm where optical fibers have low loss.

Species and genera of defects described herein have one or more equivalents known to a person of skill the art. These equivalents include isovalent or isoelectronic replacements or substitutions for one or more atoms included in the defects. Isoelectronic substitutions have the same number of valence electrons and include elements in the same period, e.g., germanium may replace carbon in a defect, or lithium may replace hydrogen. Isoelectronic substitutions include charged atoms from adjacent periods. The isoelectronic substitutions affect the mechanical and electronic structure of a defect and substitutions may be used to vary the vibrational or optical interactions with the defect. The optical transition may be affected by a splitting as described herein.

In some implementations, device 200 includes acceptor sites within semiconductor material 202 to receive electrons. One suitable material for an acceptor site is boron. An acceptor could include an acceptor from Group III (13), e.g., boron, aluminum, gallium, and indium. In some implementations, device 200 includes donor sites within the silicon material to donate electrons. One suitable defect for a donor site is phosphorus. A donor could include a donor from Group V (15), e.g., phosphorus, arsenic, bismuth and antimony.

Device 200 may include an optical structure (not shown). The optical structure can include a resonator, optical resonator, waveguide, optical coupler, optical cavity, cavity, other arrangement of refractive and reflecting material. In some implementations, defect 204 is evanescently coupled to one or more optical structures.

Device 200 may include an optical input subsystem comprising one or more optical components, such as, a light source 206. The optical component(s) are operable, e.g., act in response to execution of processor-executable instructions, to selectively apply light to defect 204. The processor-executable instructions may be executed by light source 206 or a processor. Light source 206 may apply light in a pulsed way. Optical components may apply light at, at least, a first frequency to defect 204. The first frequency corresponds (e.g., near, at) to an energy difference between the pair of computational states of defect 204, e.g. orbital states. Light source 206 may be communicatively coupled to the processor(s) 105 in system 100 and operate in response to processor(s) 105 executing processor-executable instructions. The optical input component(s) (e.g., light source 206) may be disposed in, on, near, or distant (to) semiconductor material 202. The relative locations and orientations of the components shown in FIG. 2 have largely been chosen for illustrative purposes, for example, light from light source 206 need not be collinear with the magnetic field and perpendicular to the electric field and the like.

Device 200 may include one or more electric field subsystems including electrical components, such as, electrodes 208. The electric field subsystem(s) can, e.g., act in response to execution of processor-executable instructions, apply an electric field of, at least, a first strength to semiconductor material 202 or defect 204. The electric field may include a gradient. That is the electric field subsystem(s) in response to executing processor-executable instructions vary an electric field incident on semiconductor 202. The electric field subsystem(s) effect changes in the energy eigenstates of defect 204. The electric field subsystem(s) may power components on or near semiconductor material 202. The electric field subsystem(s) may apply pulsed electrical manipulation of defect 204.

Device 200 may include one or more magnetic manipulation subsystems comprising one or more magnetic input components, such as, coil 210. The magnetic manipulation subsystem(s) can effect changes in the energy eigenstates of defect 204. The magnetic input component(s) in response to execution of processor-executable instructions selectively applies a magnetic field to semiconductor material 202 and/or defect 204 disposed within semiconductor material 202. The magnetic field may be oriented with respect to a lattice direction in semiconductor material 202 or a plurality of defects like defect 204. The magnetic field may be static or varying with respect to time or location in semiconductor material 202. In some implementations, magnetic input component(s) include a wide bore superconducting magnet. Processor(s) 105 in system 100 may, in response to execution of processor-executable instructions, direct coil 210 to apply a magnetic field to semiconductor material 202.

A magnetic manipulation subsystem(s) included in device 200 may include at least one radio frequency input component, such as antenna 212, a pair of antennae, in response to execution of processor-executable instructions selectively applies radio frequency pulses to semiconductor material 202 and/or the defect 204. Processor 105 may direct magnetic manipulation subsystem(s) (e.g., direct coil 210 and antenna 212) to flip an electronic or a nuclear spin associated with the defect 204.

Processor(s) 105 in system 100 may direct the magnetic input components and the radio frequency input component to perform magnetic resonance control, e.g., NMR and ESR, of defect 204 or a plurality of defects. For example, coil 210 may apply a field of strength $B_0$ to defect 204 and antenna 212 a radio frequency pulse at frequency that is proportional to the product of field of strength $B_0$ and the gyromagnetic ratio γ for the spin and adjusted for additional interaction(s) of the spin in device 200.

Device 200 may include a mechanical subsystem comprising one or more mechanical input components. An example of a mechanical input component is an actuator 214. Actuator 214 may be paired with a rest or support (not shown) disposed on an opposing side of semiconductor material 202. The mechanical input component(s) may, in response to execution of processor-executable instructions, selectively vary (e.g., apply, remove) a strain in at least one direction to semiconductor material 202. Thus, the mechanical subsystem can through the strain in semiconductor material 202 effect changes in the energy eigenstates of the defect 204. The mechanical input device(s) can impart strain locally within or across semiconductor material 202. The mechanical input component(s) may be disposed in semiconductor material 202 or be physically coupled to the exterior of semiconductor material 202. The mechanical subsystem may include one or more Micro-Electro-Mechanical Systems (MEMS) components that in response to execution of processor-executable instructions vary the strain in semiconductor material 202. The MEMS may be powered by the electric field subsystem(s). The mechanical subsystem may include one or more piezo-electric components.

Device 200 may include one or more cryogenic subsystems, such as, cryogenic subsystem 216. Cryogenic subsystem 216 may, in response to execution of processor-executable instructions, vary a thermal profile (e.g., temperature, temperature gradient, temperature with spatial or temporal variation) of semiconductor material 202 and effect changes in the energy eigenstates of defect 204. Cryogenic subsystem 216 may include one or both of a heater 217 or a cooler 218. Cryogenic subsystem 216 may be operable, e.g., in response to execution of processor-executable instructions, to selectively warm, cool, or create a thermal gradient in semiconductor material 202.

In various implementations, examples of device 200 operate as information processors in which one or more input subsystem or devices are communicatively coupled to semiconductor material 202 or defect 204. The one or more input subsystem or devices may be physically coupled to semiconductor material 202. For example, an input subsystem overlies the semiconductor material 202, is disposed near the semiconductor material 202, or is disposed within the semiconductor material 202. The optical input component(s), the electrical input component(s), the magnetic input component(s), and the like may overlie (which includes underlies) a part of semiconductor material 202, or may be structures defined in semiconductor material 202. One or more output subsystem or readout devices are communicatively and/or physically coupled to semiconductor material 202 or defect 204. For example, a photon detector may be positioned like light source 206. Further examples of read out devices and detectors are described herein, at least, in relation to FIGS. 1, 6A, 6B, and 7.

Figure 3A:
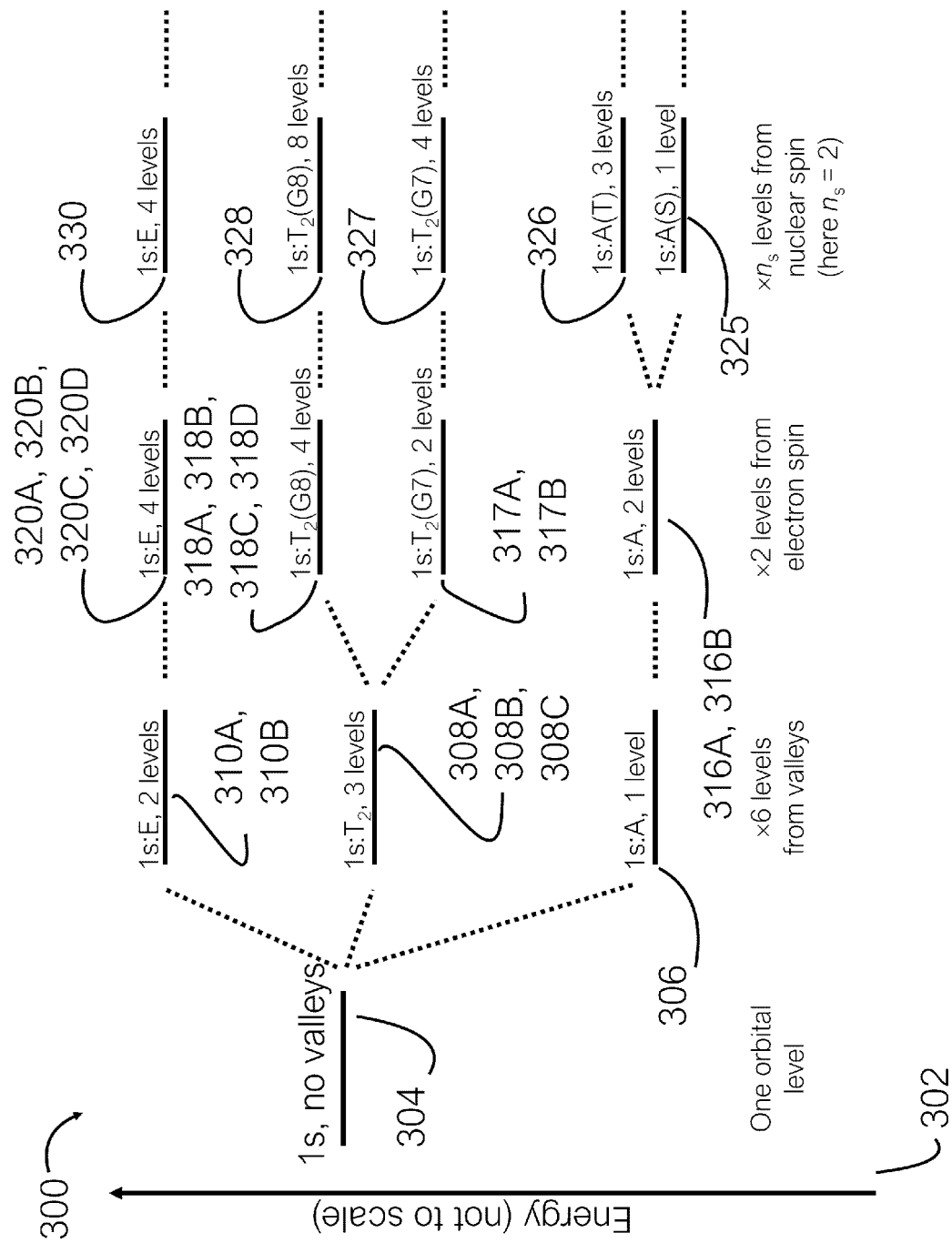
FIG. 3A is a schematic diagram illustrating a plurality of energy levels for orbital states associated with the example defect shown in FIG. 2.

FIG. 3A is a schematic diagram illustrating an exemplary plurality of energy levels or energy eigenstates 300 for states associated with a singly ionized chalcogen deep donor (e.g., 77Se$^+$) included in device 200 as an example of defect 204. Different defects will have different labels for energy eigenstates 300. For example, lithium has a different order for the energy eigenstates 300. Other defects have different energy eigenstates 300 such as the sub-levels being labelled differently. Energy eigenstates 300 are plotted against an energy axis 302 (not to scale). The plurality of energy eigenstates 300 includes energy eigenstates 304, 306, et seq. Orbital energy eigenstate 304 is a hydrogenic orbital state labeled 1s in accordance with atomic orbital labelling conventions. Orbital levels can be denoted by labels $Xa^y$, where X is the energy level corresponding to the principal quantum number n, type a is a lower-case letter denoting the shape or subshell of the orbital corresponding to the angular quantum number $\ell$, and y is the number of electrons in that orbital. For example, the orbital $1s^2$ has two electrons and is the lowest energy level (n=1) and has an angular quantum number of $\ell=0$ or a spherical shape.

The valley structure of semiconductor material 202 splits orbital energy eigenstate 304 into valley-orbital states 306, 308, and 310. That is, bulk indirect semiconductor materials, such as, silicon have a crystal structure, also known as valley structure, that splits the hydrogenic states of a defect six ways, i.e., six-fold orbital degeneracy. This degeneracy can be lifted by imparting strain on the semiconductor material, applying an electric field, or the like. The valley structure splits orbital energy eigenstate 304 into six energy eigenstates: valley-orbital energy eigenstate 306 (1s:A); valley-orbital energy eigenstates 308A, 308B, and 308C (1s:T$_2$); and valley-orbital energy eigenstates 310A and 310B (1s:E). The labels A, T$_2$, and E are appended to the orbital label 1s. There is no convention for sublevels, e.g., differentiating energy eigenstates 308B and 308C. The valley structure can split higher order orbital states, such as, 2s, 2p, 3s, and the like (not shown).

The electron spin splits the valley-orbital energy eigenstates 306, 308A, 308B, 308C, 310A, and 310B into (electron) spin-valley-orbital energy eigenstates 316A, 316B, 317A, 317B, 318A, 318B, 318C, 318D, 320A, 3206, 320C, and 320D. That is, the electron spin splits valley-orbital energy eigenstate 306 into spin-valley-orbital energy eigenstate 316A and spin-valley-orbital energy eigenstate 316B. The electron spin splits valley-orbital energy eigenstates 308A, 308B, and 308C into spin-valley-orbital energy eigenstates 317A and 317B with G7 sub-label and spin-valley-orbital energy eigenstates 318A, 318B, 318C, and 318D with G8 sub-label. It will be understood that the G7 and G8 sub-labels are not conventional labels for all possible deep defect species or charge states but are used here for purposes of illustration only. The electron spin splits valley-orbital energy eigenstates 310A and 310B into spin-valley-orbital energy eigenstates 320A, 320B, 320C, and 320D. In alternative language, electron spin provides a fine structure in energy eigenstates 300.

The nuclear spin, when present, splits the spin-valley-orbital energy eigenstates 316A, 316B, 317A, 317B, 318A, 318B, 318C, 318D, 320A, 320B, 320C, and 320D into (nuclear) spin-spin-valley-orbital energy eigenstates 325, 326, 327, 328, and 330. The value of the nuclear spin is selected by the species of the defect. Where the nuclear spin is spin-1/2 the splitting is two-fold (shown). Where the nuclear spin is spin-0 (e.g., defect 204 is selenium-78 or sulfur-32) there is no splitting (not shown), and when the nuclear spin is spin-3/2 (e.g., sulfur-33) the splitting is four-fold (not shown). In other words, nuclear spin provides a hyperfine structure in energy eigenstates 300.

Herein the spin-valley-orbital energy eigenstates 316, 317, 318, and 320; and spin-spin-valley-orbital energy eigenstates 325, 326, 327, 328, and 330 may be referred to as "orbital states" and associated transitions as "orbital transitions".

Figure 3B:
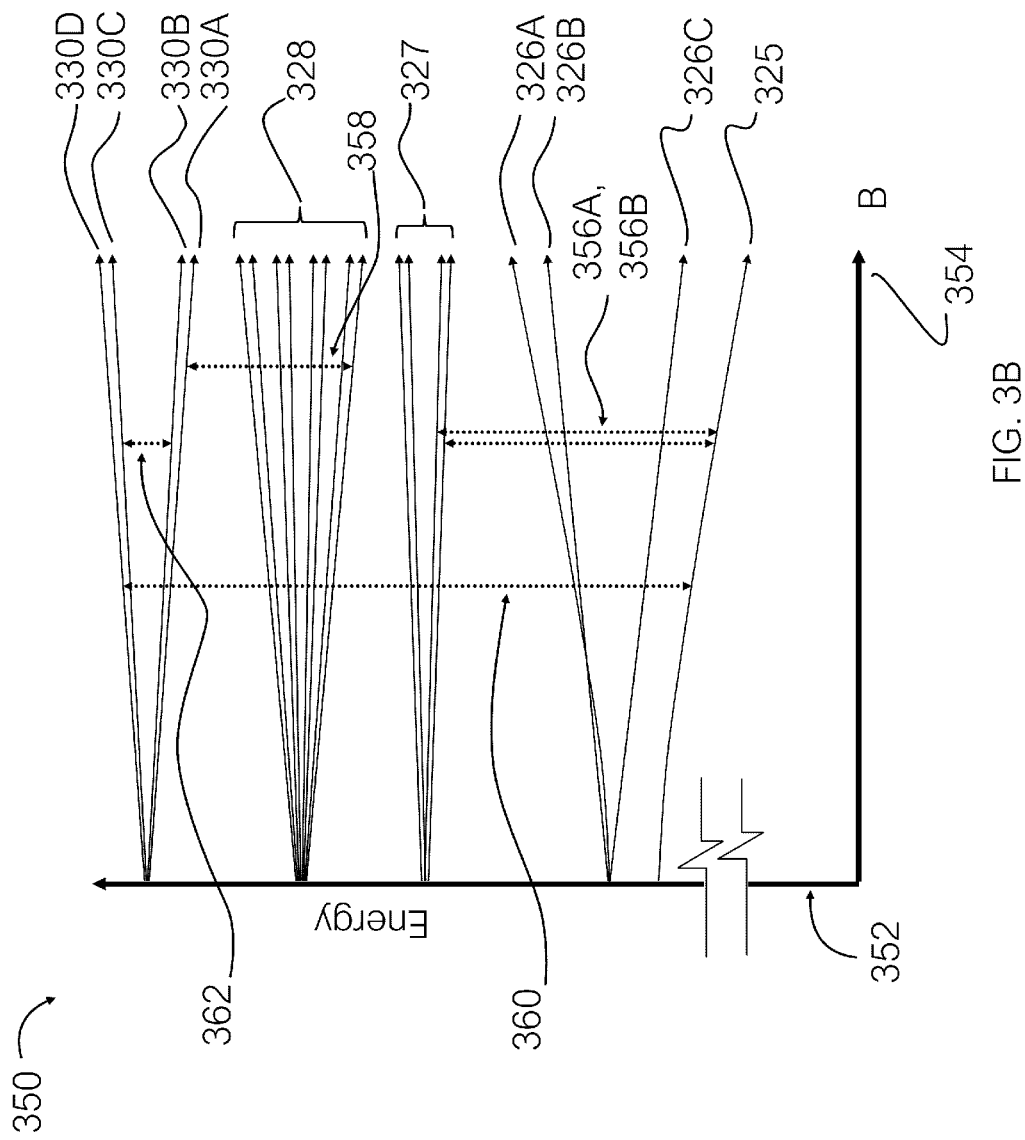
FIG. 3B is a graph illustrating energy levels plotted against magnetic field for orbital states associated with the example defect shown in FIG. 2.

The plurality of energy eigenstates 300 can be modified via variation of applied electric field, magnetic field, light, strain, and temperature. The plurality of energy eigenstates 300 are plotted against magnetic field in FIG. 3B. FIGS. 3A and 3B can be arranged next to each other, using energy eigenstates 325, 326, 327, 328, and 330 to align the sheets and form one schematic view.

FIG. 3B is a graph 350 illustrating energy levels plotted against magnetic field strength. Graph 350 includes an energy axis 352 and a magnetic field axis 354. The energy levels of a plurality of energy eigenstates (i.e., allowed steady-states) for a defect are plotted against magnetic field. As shown the defect is a singly ionized chalcogen deep donor (e.g., 77Se$^+$) and other donors or charge states may have different energy levels and may be labelled differently. The plurality of eigenstates includes eigenstates 325, 326A, 236B, 326C, 327, 328, 330A, 330B, 330C, and 330D. Similar graphs exist showing how eigenstates 325, 326A, 236B, 326C, 327, 328, 330A, 330B, 330C, and 330D vary with changes in electric field, temperature, light, and strain on semiconductor material.

Graph 350 includes a plurality of transitions between a plurality of eigenstates. Various transitions, e.g., energy differences, are illustrated but any two energies of the plurality of eigenstates may support a transition subject to selection rules, e.g., the transition moment integral should be non-zero. The transitions are illustrated spaced apart on axis 354 to reduce visual clutter and transitions may align on axis 352. Transition 356A and transition 356B are between spin-valley-orbital eigenstate 325 and a pair of eigenstates in spin-valley-orbital eigenstates 327. Transition 358 is a transition between an eigenstate in spin-valley-orbital eigenstates 328 and spin-valley-orbital eigenstate 330A. Transition 360 is between spin-valley-orbital eigenstate 325 and spin-valley-orbital eigenstate 330D. Transition 362 is between two eigenstates in spin-valley-orbital eigenstates 330: eigenstate 330B and eigenstate 330C.

FIG. 4 includes a table 400 illustrating computational states based on energy eigenstates shown in FIGS. 3A and 3B. The computational states for quantum computing and quantum information processing vary with implementation. In some implementations, the first ($|0\rangle$) and the second ($|1\rangle$) computational states are defined by (spin-)spin-valley-orbital states. In some implementations, multiple qubits are encoded by multiple (spin-)spin-valley-orbital states of a single defect. In some implementations, one or more "qudits" are encoded by multiple (spin-)spin-valley-orbital states. Partial Code 1 shown in second column of table 400 has a first computational state, $|0\rangle$, that includes the valley-orbital energy eigenstate 306 (labelled 1s:A), and a second computational state, $|1\rangle$, that includes the valley-orbital energy eigenstate 308A (labelled 1s:$T_2$). The spin states of Partial Code 1 are not defined and the energy difference between the computational states is not uniquely defined.

In some implementations, the computational states include a spin state. For example, the spin state of a nuclear spin of defect 204. An example partial code is $|0\rangle = |*, *, \downarrow\rangle_{oen}$ and $|1\rangle = |*,*,\uparrow\rangle_{oen}$, where "oen" is (valley-)orbital, electron, and nuclear indices and * is a wildcard. In some implementations, the computational states include the electron spin of an electron for the defect 204. An example, partial code is $|0\rangle = |*,\downarrow,*\rangle_{oen}$ and $|1\rangle = |*,\uparrow,*\rangle_{oen}$. In some implementations, the computational states include electron spin and nuclear spin for the defect 204 where the computational states differ by none, one, or both of the electron spin and nuclear spin. In some implementations, the up/down spin labelling convention corresponds to two arbitrary spin eigenstates, and not necessarily defined with respect to the alignment of the background magnetic field. In some implementations, the nuclear spin is 3/2, 5/2 or higher, and the up/down labelling is taken to represent two of the many available nuclear spin eigenstates. In some implementations, the charge state of the defect possesses multiple electrons, and the up/down labelling is taken to represent two of the many available electron spin eigenstates.

A Hamiltonian describing the spin interactions for a single unpaired electron spin and the nuclear spin of an isolated singly-ionized defect, such as, defect 204 in the presence of a magnetic field (e.g., $\vec{B}=-B\hat{z}$) is:

$$H = g_e \mu_B B \sigma_e^z - g_n \mu_n B \sigma_n^z + A \vec{\sigma}_e \cdot \vec{\sigma}_n$$

The first two terms are the Zeeman terms for the electron and nuclear spins while the third term is the hyperfine interaction. Here, $\mu_B$ is the Bohr magneton, $\mu_n$ is the nuclear magneton, and $g_e$ and $g_n$ are the electronic and nuclear g factors. The $\sigma_e^z$ and $\sigma_n^z$ are the z-parts of the full spin operators (e.g., $\vec{\sigma}_e$), B is the magnetic field defined above; and A is a defect and environment (e.g., semiconductor, field profile) dependent constant, i.e., a hyperfine constant. Absent effects due to the electron spin, the nuclear spin states differ by an energy, such as, $$E_0 = \left(\frac{h}{2\pi}\right)\omega_0,$$

corresponding to the nuclear resonance frequency. In general, the nuclear spin states differ in energy dependent upon nearby electron spin state(s) and other environmental parameters. The electron spin states differ in energy too by an amount dependent on nuclear spin, and the like. By applying magnetic pulses in the transverse direction $\vec{B}_T = B_T \sin(\omega_0 t) \hat{x}$ the spins oscillate at the nuclear resonance frequency. In this example of a sigma-X operation the spins can be flipped, be put into a superposition of states, and the like. This allows for the magnetic manipulation subsystem (e.g., part of input subsystem 156 shown in FIG. 1) to perform magnetic resonance control, e.g., NMR and ESR, on one or more nuclear or electron spins of a plurality of defects. The magnetic resonance control may be used in qubit manipulations, including when a qubit's computational states differ in valley and/or orbital degrees of freedom.

In some implementations, the computational states include electron spin states and include the same electron spin for both computational states which otherwise differ by a valley and/or orbital state. Partial Code 2 shown in third column of table 400 has a first computational state, $|0\rangle$, that includes the valley-orbital energy eigenstates 1s:A and the down electron spin state, and an unspecified nuclear state. In Partial Code 2 the first computational state includes spin-valley-orbital eigenstates 316A or 316B (FIG. 3A). For the purposes of Partial Code 2 we take level 316A to label and represent electron spin down. The second computational state includes valley-orbital eigenstates 317A or 317B (FIG. 3A). For the purposes of Partial Code 2 we take level 317A to label and represent electron spin down. The second computational state, $|1\rangle$, includes the valley-orbital energy eigenstates 1s:$T_2$(G7), the down electron spin state, and the nuclear state is unspecified. For the illustrated defect and charge state in FIGS. 3A and 3B, levels 317A and 317B have an inverted electron spin labeling (i.e. electron spin down is higher in energy than electron spin up). For a spin 1/2 nuclear spin, as shown in FIG. 3B, there are four possible energy differences between the computational states 316A and 317A. Two of the four possible energy differences between computational states for Partial Code 2 are labelled transitions 356A and 356B shown in FIG. 3B.

Computational states can differ from valley-orbital energy eigenstates with no difference in spin states. In Code 3 shown in third column of table 400 has a first computational state, $|0\rangle$, that includes the valley-orbital energy eigenstate 1s:$T_2$(G8), an electron state corresponding to spin-down (e.g., electron spin quantum number m=—1/2), and the down nuclear spin state. The first computational state for Code 3 includes an eigenstate in spin-valley-orbital eigenstates 328. The second computational state includes eigenstate 330B. The second computational state, $|1\rangle$, includes the valley-orbital energy eigenstate 1s:E, the down electron spin state, and the down nuclear spin state. The energy difference between computational states for Code 3 is energy difference of transition 358 shown in FIG. 3B.

Computational states can differ by one or more spin states, e.g., electron, nuclear, or electron and nuclear spin. Code 4, shown in fifth column of table 400, has a first computational state, $|0\rangle$, that includes the valley-orbital energy eigenstates 1s:A, the down electron spin state, and the up nuclear spin state. The first computational state for Code 4 includes spin-valley-orbital eigenstates 325. The second computational state includes spin-valley-orbital eigenstates 330D. The second computational state, |1⟩, includes the valley-orbital energy eigenstates 1s:E, the up electron spin state, and the down nuclear spin state. The energy difference between computational states for Code 4 is energy difference of transition 360 shown in FIG. 3B.

Computational states can differ by one or more spin states, e.g., electron, nuclear, or electron and nuclear spin, but not differ by valley-orbital eigenstates. The second computational state can have a higher energy than the first computational state. Code 5, shown in sixth column of table 400, has a first computational state, |0⟩, that includes the valley-orbital energy eigenstates 1s:E, the down electron spin state, and the down nuclear spin state. The first computational state for Code 4 includes spin-valley-orbital eigenstates 330B. The second computational state includes spin-valley-orbital eigenstates 330C. The second computational state, |1⟩, that includes the valley-orbital energy eigenstates 1s:E, the up electron spin state, and the up nuclear spin state. The energy difference between computational states for Code 5 is energy difference of transition 362 shown in FIG. 3B.

A Hamiltonian describing the spin-orbital interactions for the electron spin or the nuclear spin and an orbital valley transition of an isolated defect, such as, singly-ionized defect, as an example of defect 204, is a complicated square matrix of size $6 \times 2 \times n_s$ where $n_s$ depends on the value of the nuclear spin, e.g., s=1/2 then $n_s$=2 as shown in FIG. 4 (when s=0 then $n_s$=0 and s=3/2 then $n_s$=4). That is the interactions which give rise to the eigenstates shown on the right-hand side of FIG. 3A can be represented by a 24×24 Hamiltonian. A skilled person may appreciate a more compact computational Hamiltonian.

The computational Hamiltonian can be of the form $$H_c = \vec{c}(t) \cdot \vec{\sigma} + \varepsilon(t)\sigma^z$$

Where $\vec{\sigma} = [\sigma^x, \sigma^y, \sigma^z]$, the Pauli matrices; $\vec{c}(t) = [c_x(t), c_y(t), c_z(t)]$; $c_x(t), c_y(t), c_z(t)$ are time dependent control signals; and $\varepsilon(t)$ is also a time dependent control signal that in some implementations varies more slowly than $c_z(t)$. The control Hamiltonian can be used to manipulate the computational states for defect 204. For example, the control Hamiltonian can be used to manipulate |1s:T2(G8), ↓, ↓⟩ to |1s:E, ↓, ↓⟩ as shown in table 400.

In some implementations, the defect 204 is associated with (e.g., supports, has defined for it) computational states including another degree of freedom. For example, a local degree of freedom at defect 204, such as, from further particle such as an electron, hole, or nuclear spin.

FIG. 5A and FIG. 5B are schematic diagrams illustrating computational states based on energy levels shown in FIGS. 3A and 3B. FIG. 5A includes a first axis 502 including two spin states up and down, e.g., electron spin states, and a second axis 504 including two valley-orbital eigenstates Ax:U and By:V, e.g., for defect 204. For example, Ax:U is valley-orbital eigenstate 1s:T2(G8) and By:V is valley-orbital eigenstate 1s:E. Thus, first computational state, |0⟩, 506 and the second computational state, |1⟩, 508 could be the same as in Code 3 in table 400. Thus, the transition 510 between the first computational state 506 and the second computational state 508 could occur via transition 358 shown in FIG. 3B.

FIG. 5B includes a first axis 552 including two spin states up and down, and a second axis 554 including two valley-orbital eigenstates Ax:U and By:V, e.g., for defect 204. For example, Ax:U is valley-orbital eigenstate 1s:A and By:V is valley-orbital eigenstate 1s:E. Thus, first computational state 556 and second computational state 558 could be the same as in Code 4 in table 400. The transition between the first computational state 556 and the second computational state 558 could occur via transition 560, e.g., a sigma-Y operation. The transition between the first computational state 556 and second computational state 558 could via transition 560 or could be a multistep transition. For example, via transition 562, a transition without a spin flip, and transition 564, a spin flip through temporary state 557.

FIG. 6A and FIG. 6B are schematic diagrams illustrating measurement operations via an ancillary observable, e.g., a photon, to defect 204. FIG. 6A includes a first quantum state 602 for a defect in semiconductor material, e.g., defect 204. The first quantum state 602 includes a linear combination of a first and a second computational state for (e.g., defined at) a defect. The first quantum state can be a partial trace of a larger entangled state between multiple qubits. FIG. 6A includes a second quantum state 604 for an ancillary observable, for example, an ancillary photon that may propagate proximate to the defect.

The ancillary photon is prepared in a first computational state. The computational state for photons may be based on degrees of freedom for the photon including but not limited to: polarization (e.g., horizontal versus vertical, clockwise versus counter-clockwise); presence or absence; presence in a period; frequency; phase; and combinations of the forgoing. A controller, such as, processor 105, performs a multi-qubit operation on the defect and the ancillary observable. For example, as shown, the multi-qubit operation is a CNOT gate. The multi-qubit operation may be any entangling operation, such as, a CNOT gate, a CPHASE operation, a CPHASE operation plus single qubit operations, and the like. The multi-qubit operation may alternatively be a non-entangling SWAP operation, a SWAP operation plus single qubit operations, and the like. A controller, such as, processor 105, effects a measurement 608 of the ancillary observable.

At period 610 the first quantum state 602 and the second quantum state 604 have joint state $\alpha|00\rangle + \beta|10\rangle$. As illustrated the controller performs a CNOT gate 606 on the first quantum state 602 and the second quantum state 604. At period 612 the first quantum state 602 and the second quantum state 604 have joint state $\alpha|00\rangle + \beta|11\rangle$. When the measurement 608 is a strong measurement then measurement 608 fixes (e.g., collapses, projects) the state of the defect. Measurement 608 can be a quantum non-demolition measurement (QND) in a chosen basis (e.g., the Z basis of the computational Hamiltonian). A QND measurement is obtained if the Hamiltonian describing the interaction between an observable and measurement device commutes with the observable i.e., if $[O, H_{int}]=0$. In the example given, one possible QND measurement observable is the Z basis of a spin-valley-orbital state in the defect while the measurement device is represented by, or acts upon, the ancillary photon. See Braginsky, V. B.; and F. Ya. Khalili, 1996 *Rev. Mod. Phys.* 68(1): 1-11.

FIG. 6B illustrates, schematically, one manifestation of a quantum non-demolition measurement for a defect. FIG. 6B includes a first quantum state 602 in a linear combination of a first and second computational state for a defect, and a second quantum state 604 for an ancillary observable. A controller performs a multi-qubit operation such as a CNOT gate 606 on the first quantum state 602 and the second quantum state 604. The controller effects a quantum nondemolition measurement 608 of the ancillary observable. When the measurement 608 is a strong measurement then measurement 608 fixes (e.g., collapses, projects) the state of the defect into a result 622. The measurement process may be iterated by loop 654. If the first QND measurement returns a result 622 corresponding to the state |0⟩, each following iteration of the QND measurement loop will be applied to the collapsed input state (i.e., result 622) and also return a result |0⟩. If the first QND measurement returns a result 622 corresponding to the state |1⟩, each following iteration of the QND measurement loop will be applied to the collapsed input state (i.e., result 622) and also return a result |1⟩. The number of occurrences of a result can be recorded in variables 652, e.g., $n_0$ is a count of result |0⟩. Thus, a controller can perform high-fidelity readout in a particular basis in the presence of photon loss.

Figure 7:
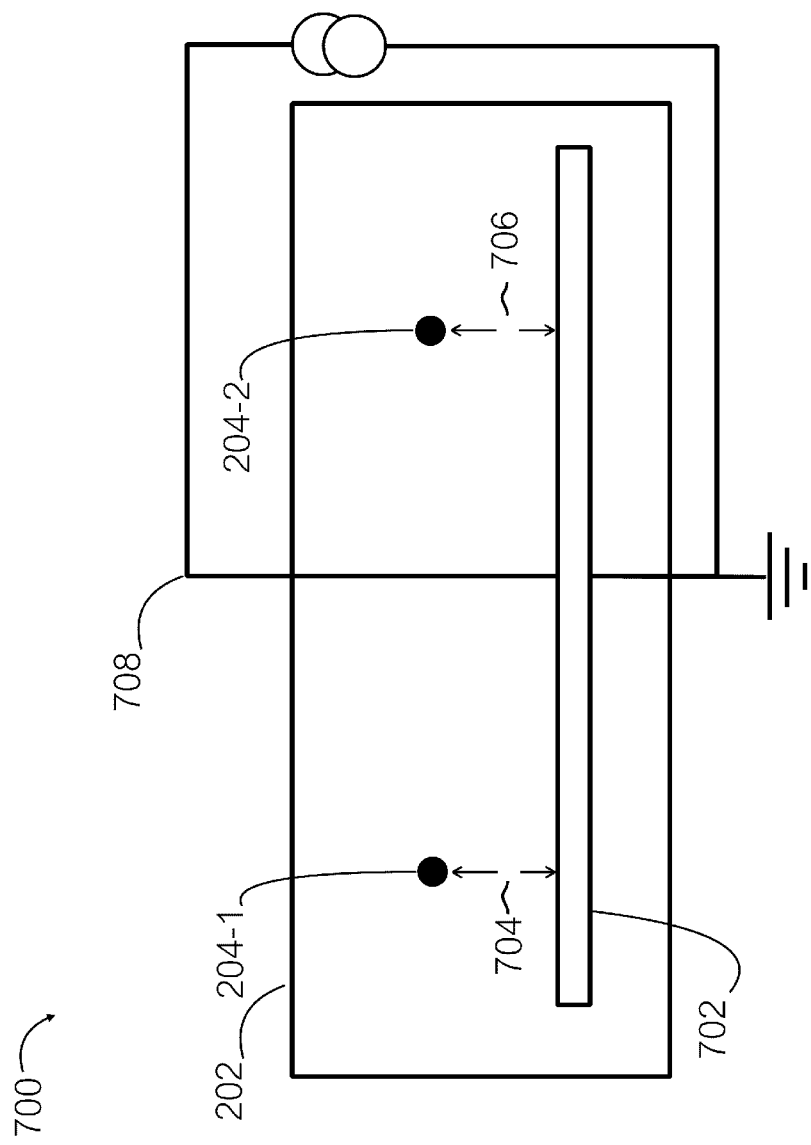
FIG. 7 is a schematic diagram illustrating a semiconductor body, a pair of exemplary defects, and a coupler.

FIG. 7 is a schematic diagram illustrating a quantum information processor 700. Quantum information processor 700 includes a semiconductor material 202, a pair of exemplary defects 204-1 and 204-2, and a coupler 702. Coupler 702 includes an optical structure disposed in or on a semiconductor material 202 proximate to both defects 204-1 and 204-2. Defect 204-1 is spaced apart from coupler 702 by a distance 704 and defect 204-2 is spaced apart from coupler 702 by a distance 706. Distance 704 and distance 706 may be different. Distance 704 and/or distance 706 may be negligible. Defect 204-1 may be disposed on a first side of coupler 702 while defect 204-2 may be disposed on a second side of coupler 702. A controller may direct an input subsystem, e.g., processor(s) 105 may direct quantum subsystem 156 to transmit a photon through coupler 702. When distances 704 and 706 are small enough given the refractive indices and physical layout of semiconductor material 202 and coupler 702 the photon in coupler 702 can couple to defects 204-1 and 204-2. Thus, a controller may effect or affect (e.g., cause or vary) a multi-qubit operation via a coupler photon disposed in the coupler 702. While one coupler (702) and two defects (204-1 and 204-2) are illustrated the quantum information processor 700 may include a different number of defects and couplers. For example, quantum information processor 700 may include three defects per coupler.

The controller may effect or affect (e.g., cause or vary) a multi-qubit operation via a virtual photon via the coupler 702 e.g., couple defects 204-1 and 204-2 via a vacuum state. The controller may control the multi-qubit operation by altering the optical properties of coupler 702. For example, by injecting carriers (e.g., electrons, holes) into coupler 702 via circuit 708 disposed in, on, or proximate to semiconductor material 202. The carriers vary the refractive index of the coupler 702, and effect or affect (e.g., cause or vary) multi-qubit operations by a virtual photon through the coupler 702.

Figure 8:
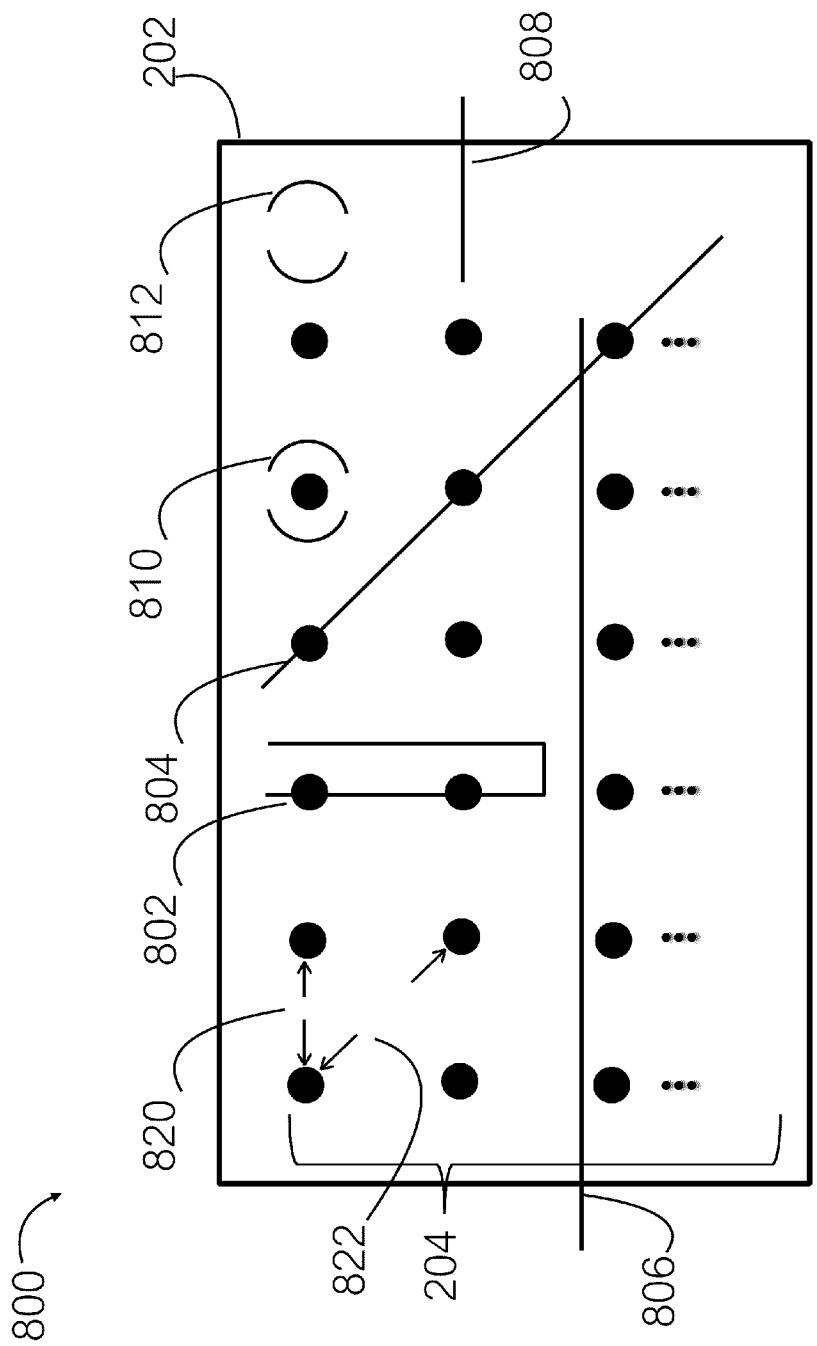
FIG. 8 is a schematic diagram illustrating a semiconductor body, a plurality of exemplary defects, and various optical structures.

FIG. 8 schematically illustrates a quantum information processor 800. Quantum information processor 800 includes semiconductor material 202, and a plurality of defects 204, e.g., luminescent point defects. The plurality of defects 204 includes a first defect, a second defect, etc. The plurality of defects 204 is shown in a regular two-dimensional array or lattice but can be in an irregular lattice by design or due to imprecision in manufacturing process. The plurality of defects 204 may have a logical lattice of one, two, or more dimensions. The plurality of defects 204 could extend in one, two, or three direction(s) in semiconductor material 202. Quantum information processor 800 includes various optical structures 802, 804, et seq. The optical structures can include waveguides and resonators. Waveguide 802 is proximate to (e.g., close enough for near-field or evanescent-wave interaction) at least one defect, as illustrated, a pair of defects 204. Waveguide 802 could be included in a coupler, for example, coupler 702. Waveguide 802 could be included in a readout device implementing the readout operations described in FIGS. 6A and 6B, FIG. 12, and the like.

Waveguide 804 (e.g., as defined in semiconductor material 202) is proximate to a plurality of defects 204. As illustrated waveguide 804 runs diagonally over some of defects 204 but need not extend in straight line or overlie the defects 204. Waveguide 806 is proximate a plurality of defects including defects 204. For example, waveguide 806 could overlie semiconductor material 202 near the plurality of defects including defects 204. Waveguide 806 extends off semiconductor material 202 and may act as part of quantum information channel 170, input system 156, and the like. Waveguide 808 may be disposed proximate to one defect included in the plurality of defects 204. Waveguide 808 may act as part of channel 170, input system 156, and the like.

Quantum information processor 800 includes a resonator 810 around a first defect in the plurality of defects 204. Resonator 810 may be used to initialize, manipulate, or readout the state of the associated first defect. Quantum information processor 800 includes a resonator 812 proximate to a second defect in the plurality of defects 204. Resonator 812 may be used to initialize manipulate, or readout the state of the associated defect. In some implementations, a resonator and a waveguide are proximate to one or more defects.

In quantum information processor 800, the plurality of defects 204 are arranged in an array or lattice where each defect in the plurality of defects 204 is spaced away from another defect by one of a plurality of offsets or translations. For example, translation 820 and translation 822. In some implementations, the plurality of defects 204 all include the same computational states. The plurality of defects 204 may include a first set (e.g., one or more) of defects having a first pair of computational states, and a second set (e.g., one or more) of defects having a second pair of computational states. See description herein at, at least, FIG. 9.

The plurality of defects 204 may include a respective defect including a plurality of respective qubits. For example, a first defect may include a first qubit that includes valley-orbital states, and the first defect may include a second qubit that includes spin states.

Figure 9:
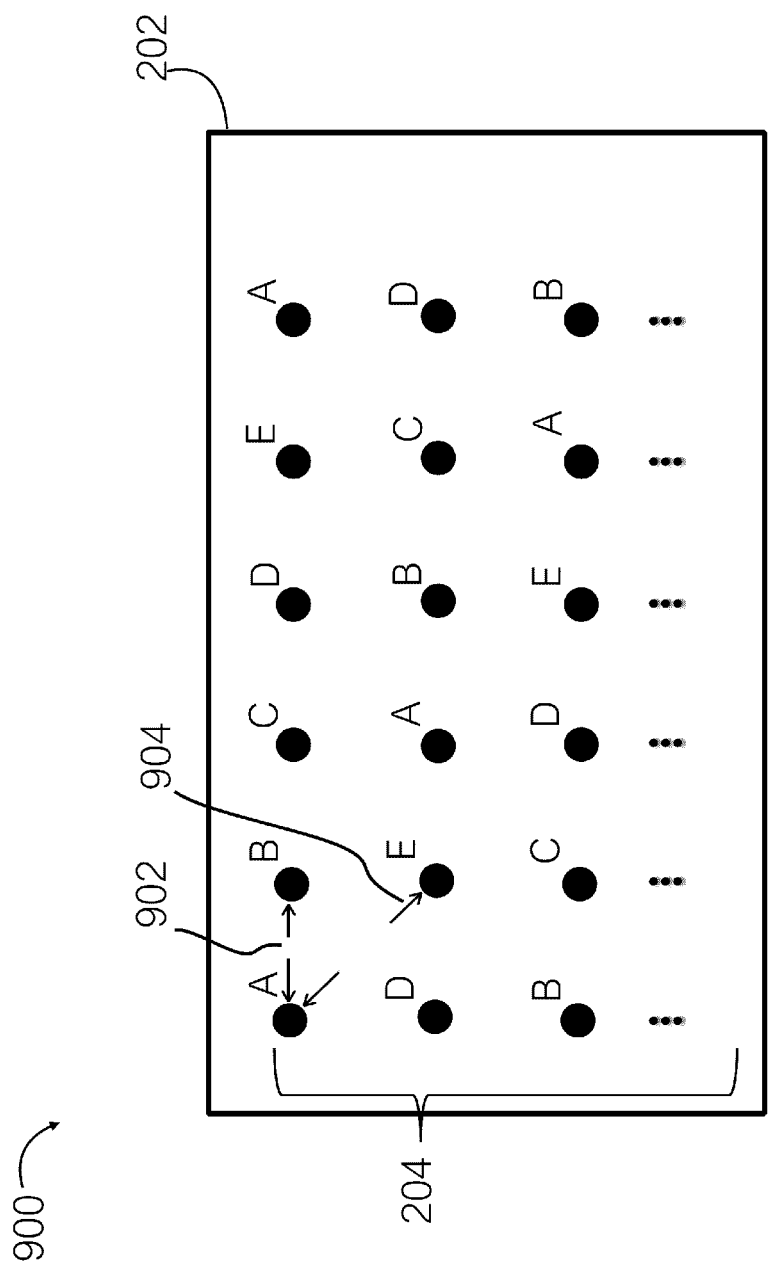
FIG. 9 is a schematic diagram illustrating a semiconductor body, and a plurality of exemplary defects having different computational states.

FIG. 9 schematically illustrates a quantum information processor 900. Quantum information processor 900 includes semiconductor material 202, a plurality of defects 204 having different computational states. In quantum information processor 900, as illustrated, the plurality of defects 204 are arranged in an array or lattice defined by translation 902 and translation 904. The lattice may be a logical lattice or a physical lattice. In some implementations, the plurality of defects 204 all include a plurality of computational states (e.g., a first defect included in defects 204 may use Code 3 and a second defect may use Code 5 as shown in FIG. 4). For example, as shown in FIG. 9, there are five (5) types of computational states (labelled A-E) used in the plurality of defects 204. As shown, from row to row in quantum information processor 900 the computational states for the defects at the start of the row varies. Like pairs of defects with the same computational states are thus spread out over quantum information processor 900. Since energy differences vary with computational states single and multi qubit operations based on specific energy differences can be applied to some or all of quantum information processor 900 with a lower chance of affecting other (i.e., non-target) defects.

Figure 10:
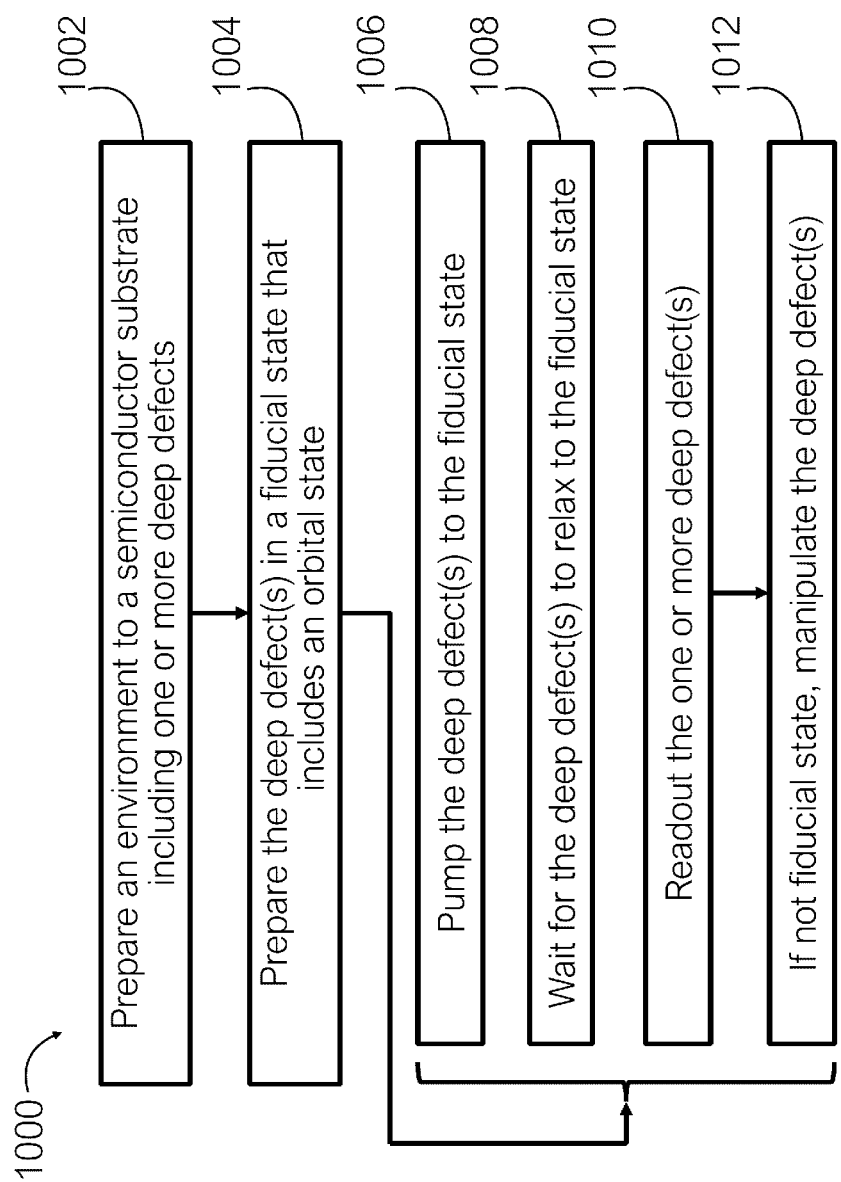
FIG. 10 is a flow-diagram illustrating an implementation of an example method of operation of a quantum information processor including one or more initialization operations.

FIG. 10 illustrates an example method 1000 (including, for example, acts 1002, 1004) of operation for a quantum information processor, such as, quantum information processors 200 and 800. For method 1000, as with other methods taught herein, the various acts may be performed in a different order than that illustrated and described. Additionally, the methods can omit some acts, and/or employ additional acts. One or more acts of method 1000 may be performed by or via one or more circuits, for instance, one or more hardware processors. In some implementations, method 1000 is performed by a controller, e.g., control subsystem 104 of system 100.

Method 1000 normally begins by invocation from a controller. At 1002, the controller prepares an environment of a semiconductor body including one or more defects. For example, the controller executes processor-executable instructions, which, when executed, cause an environment subsystem and/or input subsystem 156 to prepare device 200. The controller may prepare the semiconductor body including one or more defects according to an electric profile, magnetic profile, thermal profile, or strain profile i.e., vary profile(s) for one or more of magnetic field, electric field, strain, and heat.

The controller may, at 1002, prepare one or more defects in a specific charge state, e.g., neutral, ionized. For example, a double in a neutral state has two bound electrons, and when singly ionized one electron. The defect may be ionized by photoionization, applying carriers to surrounding semiconductor material, and the like.

At 1004, the controller prepares the one or more defects in a fiducial state that includes an orbital state. For example, a valley-orbital state, or a spin-valley-orbital state. That is, for a plurality of defects there is a fiducial state. For a representative defect in the one or more defects the fiducial state includes a spin-valley-orbital state, e.g., an orbital state split by valley and spin interactions. The controller may prepare the one or more defects in the fiducial state in different ways including acts 1006, 1008, and 1010.

At 1006, the controller prepares the one or more defects in the fiducial state by executing processor-executable instructions, which when executed cause the input subsystem to pump the one or more defects to the fiducial state. For example, the processor(s) 105 may direct the input subsystem 156 to use an optical or electrical input device to excite or elevate a defect into a computational state for a code shown in FIG. 4.

At 1008, the controller prepares the one or more defects in the fiducial state by executing processor-executable instructions, which when executed causes a quantum information processor to wait for the one or more defects to relax into the fiducial state.

At 1010, the controller prepares the one or more defects in the fiducial state by executing processor-executable instructions, which when executed causes a quantum information processor to readout the one or more defects. That is, measure the state of the one or more defects, such as, measure defect 204. The controller may read out the state of the one or more defects as described herein with reference to, at least, FIGS. 1, 6A, 6B, and 12.

The controller may perform a parity measurement, e.g., measure an aggregate property for a plurality of defects in the one or more defects. Examples of parity measurements are described herein with reference to, at least, FIGS. 1 and 12.

If the state of the one or more defects is not the fiducial state then at 1012 the controller may manipulate the defect(s) into the fiducial state. For example, if a defect is measured by the controller and has state, $|1\rangle$, then the controller may perform a bit flip operation on the defect, e.g., $\sigma^x|1\rangle = |0\rangle$. Examples of single qubit operations are described herein with reference to, at least, FIGS. 11 and 13. Alternatively, if the state of the one or more defects is not the fiducial state then at 1012 the controller may manipulate the defect(s) based on the defect(s) being in another state, e.g., a second computational state.

Method 1000 ends until invoked again. Method 1000 may be followed by one or more other methods such as method 1100.

Figure 11:
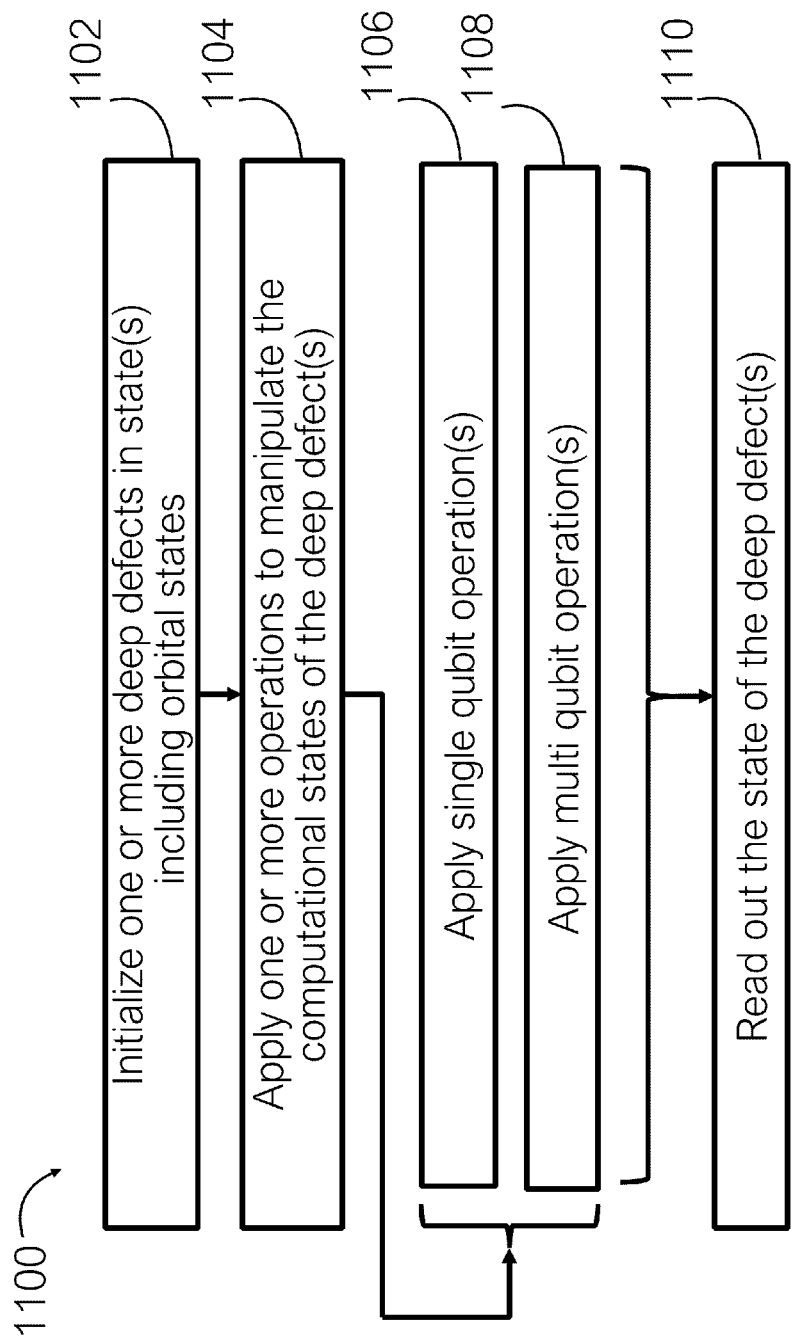
FIG. 11 is a flow-diagram illustrating an implementation of an example method of operation of a quantum information processor including one or more qubit operations.

FIG. 11 illustrates an example method 1100 (including, for example, acts 1102, 1104) for operation of a quantum information processor, such as, device 200, and quantum information processors 700 and 900. One or more acts of method 1100 may be performed by or via one or more circuits, for instance one or more hardware processors. In some implementations, method 1100 is performed by a controller, e.g., processor(s) 105 of system 100.

Method 1100 normally begins by invocation from a controller. At 1102, the controller initializes one or more defects in states including orbital states. For example, the controller prepares the one or more defects in a fiducial state that includes an orbital state, e.g., a spin-valley-orbital. The controller may prepare the one or more defects in a fiducial state by performing method 1000.

At 1104, the controller applies one or more operations to manipulate the states of the one or more defects. For example, the controller executes processor-executable instructions, and in response to executing the processor-executable instructions, the controller directs one or more operations to manipulate the computational states of the one or more defects. At 1106, the controller applies one or more single qubit operations to manipulate the states of the one or more defects. At 1108, the controller applies one or more multi-qubit operations to manipulate the states of two or more defects. For example, processor(s) 105 can execute special information processor control instructions 130 to direct defect 204-1 and defect 204-2 in quantum information processor 700 to optically couple.

At 1110, the controller reads out the state of the one or more defects. Examples of how a controller reads out the state of the one or more defects is described herein in with reference to, at least, FIGS. 1, 6A, 6B, and 12.

Method 1100 ends until invoked again.

Figure 12:
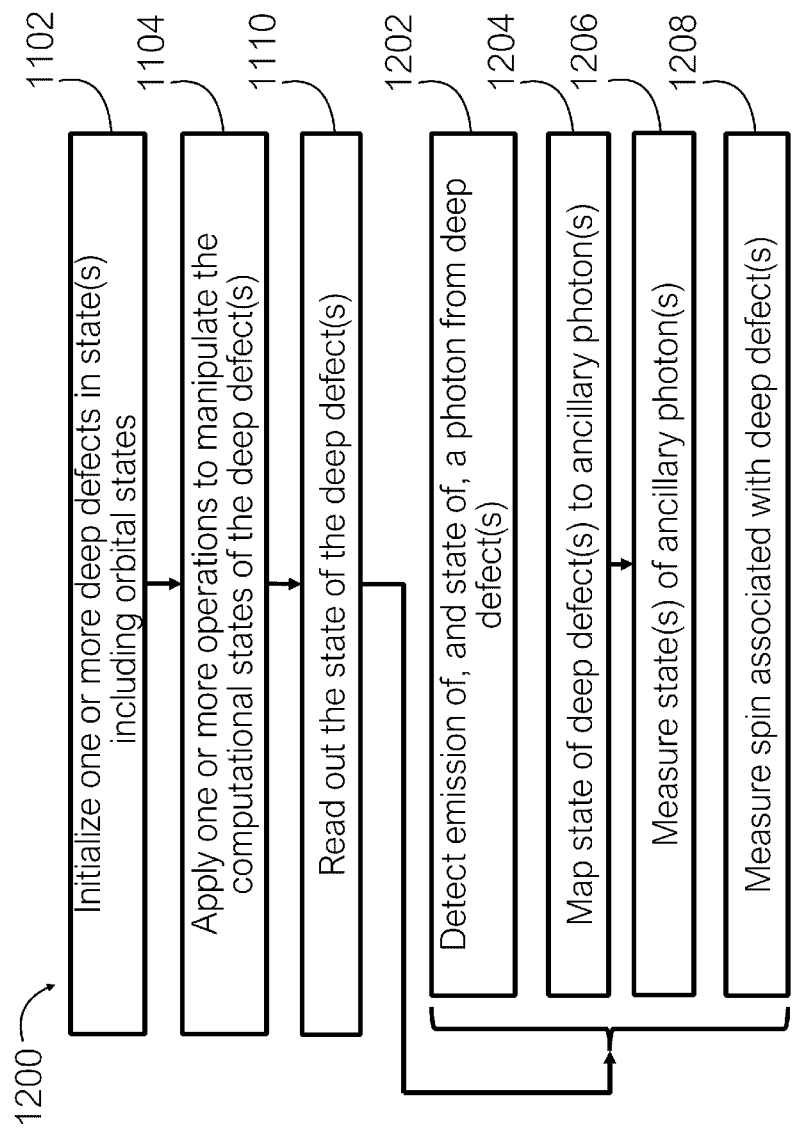
FIG. 12 is a flow-diagram illustrating an implementation of an example method of operation of a quantum information processor including one or more readout operations.

FIG. 12 illustrates an example method 1200 of operation for a quantum information processor, such as, quantum information processors 700 and 900. One or more acts of method 1200 (e.g., acts 1102, 1104, 1110, 1202, 1204) may be performed by or via one or more circuits, for instance one or more hardware processors. In some implementations, method 1200 is performed by a controller, e.g., control subsystem 104 of system 100.

Method 1200 normally begins by invocation from a controller. At 1102, the controller initializes one or more defects a fiducial state. At 1104, the controller applies one or more operations to manipulate the states of the one or more defects.

At 1110, the controller reads out the state of the one or more defects. The controller may read out the states of the one or more defects in different ways including acts 1202, 1204, 1206 and 1208. At 1202, the controller detects emission of, and state of, a photon from one defect in the one or more defects. For example, output subsystem 158 includes a measurement device directed at waveguide 808 included in quantum information processor 800. At 1204, the controller maps a state of a defect included in the one or more defects to an ancillary photon. Examples of a map of a state of a defect to a state of an ancillary photon are described herein with reference to, at least, FIGS. 6A and 6B. At 1208, the controller measures one or more spins associated with one or more defects. The state of the spin may indicate the computational state of the defect. That is, the two computational states differ by a spin value, e.g., Code 4 shown in FIG. 4. Examples of measurement of one or more spins associated with one or more defects is described herein at least with reference to FIG. 15.

The controller at acts 1202, 1204, or 1206 may use measurement techniques known in quantum information processing. For example, the controller at acts 1202, 1204, or 1206 may perform a parity measurement, e.g., measure an aggregate property for a plurality of defects in the one or more defects. Examples of parity measurements are described herein at, at least, FIGS. 1 and 12.

The controller at acts 1202, 1204, or 1206 may measure in a superposition basis. The controller at acts 1202, 1204, or 1206 may measure a first defect via an associated component, such as, an optical structure, or an ancillary or reporter defect. Method 1200 ends until invoked again.

Figure 13:
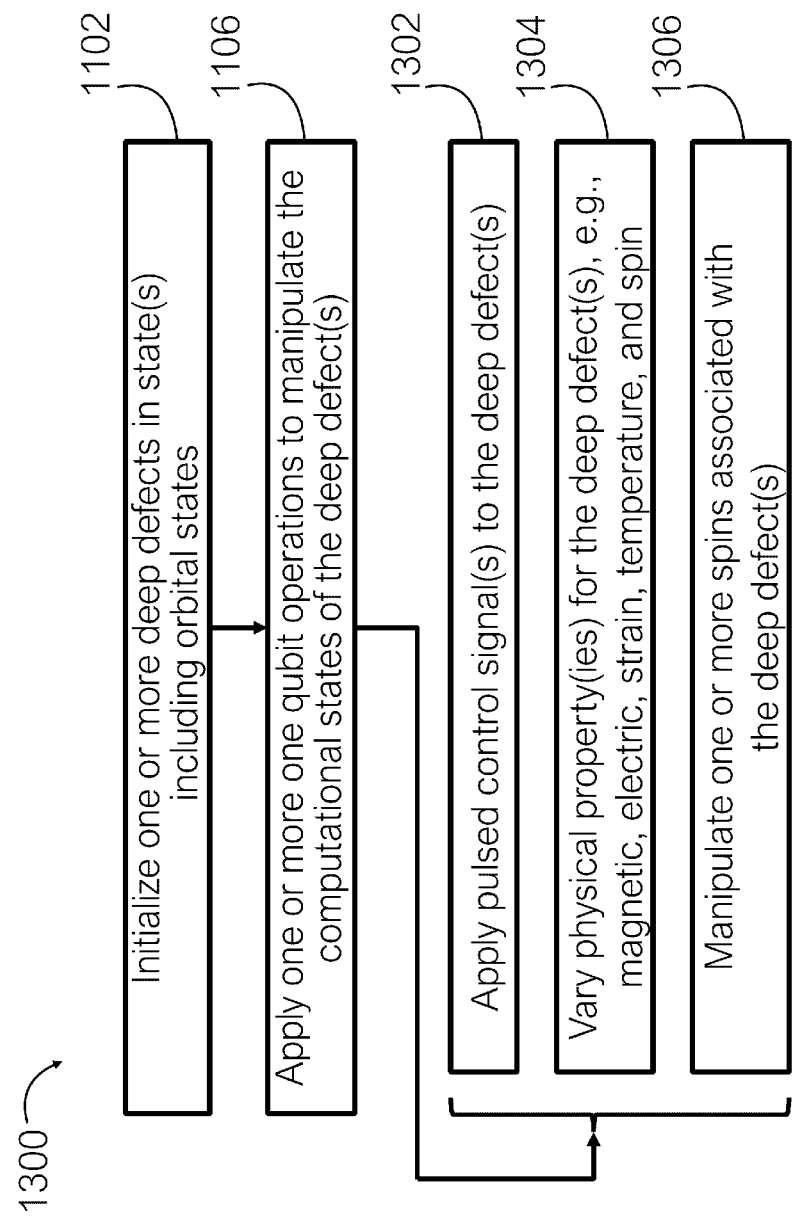
FIG. 13 is a flow-diagram illustrating an implementation of an example method of operation of a quantum information processor including one or more single qubit operations.

FIG. 13 illustrates an example method 1300 of operation for a quantum information processor, such as, device 200, quantum information processors 700, 800 and 900. One or more acts of method 1300 (e.g., acts 1102, 1106, 1302, 1304, etc.) may be performed by or via one or more circuits, for instance one or more hardware processors. In some implementations, method 1300 is performed by a controller, e.g., processor(s) 105 of system 100. In some implementations, the processor(s) 105 executes the quantum information processor control instructions 130 and in response system 100 performs method 1300.

FIG. 13 illustrates, amongst other parts, examples of act 1106 of a quantum information processor, such as, device 200, quantum information processors 800, and 900.

Method 1300 normally begins by invocation from a controller. At 1102, the controller initializes one or more defects in a fiducial state. At 1106, the controller applies one or more single qubit operations to manipulate the state(s) of the one or more defects. The controller may apply one or more single qubit operations to manipulate the states of the one or more defects in different ways including acts 1302, 1304, and 1306.

At 1302 the controller applies (or causes to be applied) pulsed signals to the one or more defects. Pulsed signals are time varying signals (e.g., shaped) at the appropriate frequency (e.g., near the energy difference for the computational states) with appropriate phase and duration to effect a gate operation. For example, the controller could effect a pi/2 sigma-X pulse on the one or more defects. The pulsed signals can be implemented via the magnetic manipulation subsystem, including coil 210, antenna 212, and a waveform generator, such as, a Tektronix AWG5200 generator, available from Tektronix, Inc. of Beaverton, OR, US.

The controller, at 1302, can cause signals to be applied at an appropriate frequency, such as, a frequency corresponding to the energy difference between the computational states of a qubit in the qubit's rotating frame. For example, the qubit may be driven by a series of pulses along a path defined on the Bloch sphere with the effect of changing the effective difference in energy between computational states. Such a driven qubit can be manipulated by near resonant signals to this changed energy difference.

The controller may, at 1302, apply signals through the sum or difference of two primary signals. For example, the controller cause and input subsystem to apply two pulses that differ in frequency by a "near-computational" frequency difference.

In some implementations, the controller affects a single qubit operation by going through an intermediate (temporary) state as indicated by transition 562, transition 564, and temporary state 557 shown in FIG. 5B. That is, the controller applies, via an input subsystem, a plurality of pulses. For example, the first pulse includes a first frequency corresponding to an energy difference between the first computational state and the temporary state. The second pulse includes a second frequency related to an energy difference between the temporary state and the first second computational state.

At 1304 the controller varies (or causes to be varied) physical conditions for the one or more defects. For example, the controller can direct the input subsystem 156 to vary the profile for magnetic field, electric field, strain, and heat. For example, the controller could cause electrodes 208 to vary the electric field for defect 204. The controller could operate light source 206 to vary the electric field for defect 204. In some implementations, the controller could vary the magnetic field profile via one or more magnetic input components such as coil 210. The controller could vary the strain profile (e.g., strength, location, gradient, anisotropy) via one more mechanical input devices. In some implementations, the controller could vary the thermal profile for one or more quantum information processors. For example, the controller could cause heater 217 and cooler 218 to vary the temperature of the defect.

At 1306, the controller manipulates (or causes to be manipulated) spins associated with the one or more defects. The controller could apply (or cause to be applied) pulsed signals to the one or more defects. The pulsed signals can be implemented via the magnetic manipulation subsystem, coil 210, and antenna 212. The pulse signals could be directed at the electron spin or the nuclear spin associated with the one or more defects. The controller may map information from the computational (e.g., spin-valley-orbital) states associated with the one or more defects to one or more spin states, manipulate the one or more one or more spin states, and map the one or more one or more spin states back to computational states of the one or more defects. The controller may map information from a first set of computational (e.g., spin-valley-orbital) states associated with the one or more defects to a second set of computational states, manipulate the information within this second set of computational states, and map the information back to the first set of computational states of the one or more defects. In other words, at 1306, the controller manipulates a defect by temporarily manipulating an associated degree of freedom such as spin to impart a phase onto a superposition of computational (e.g. orbital) states. The controller can, at 1306, manipulate other ancillary degrees of freedom.

Method 1300 ends until invoked again.

Figure 14:
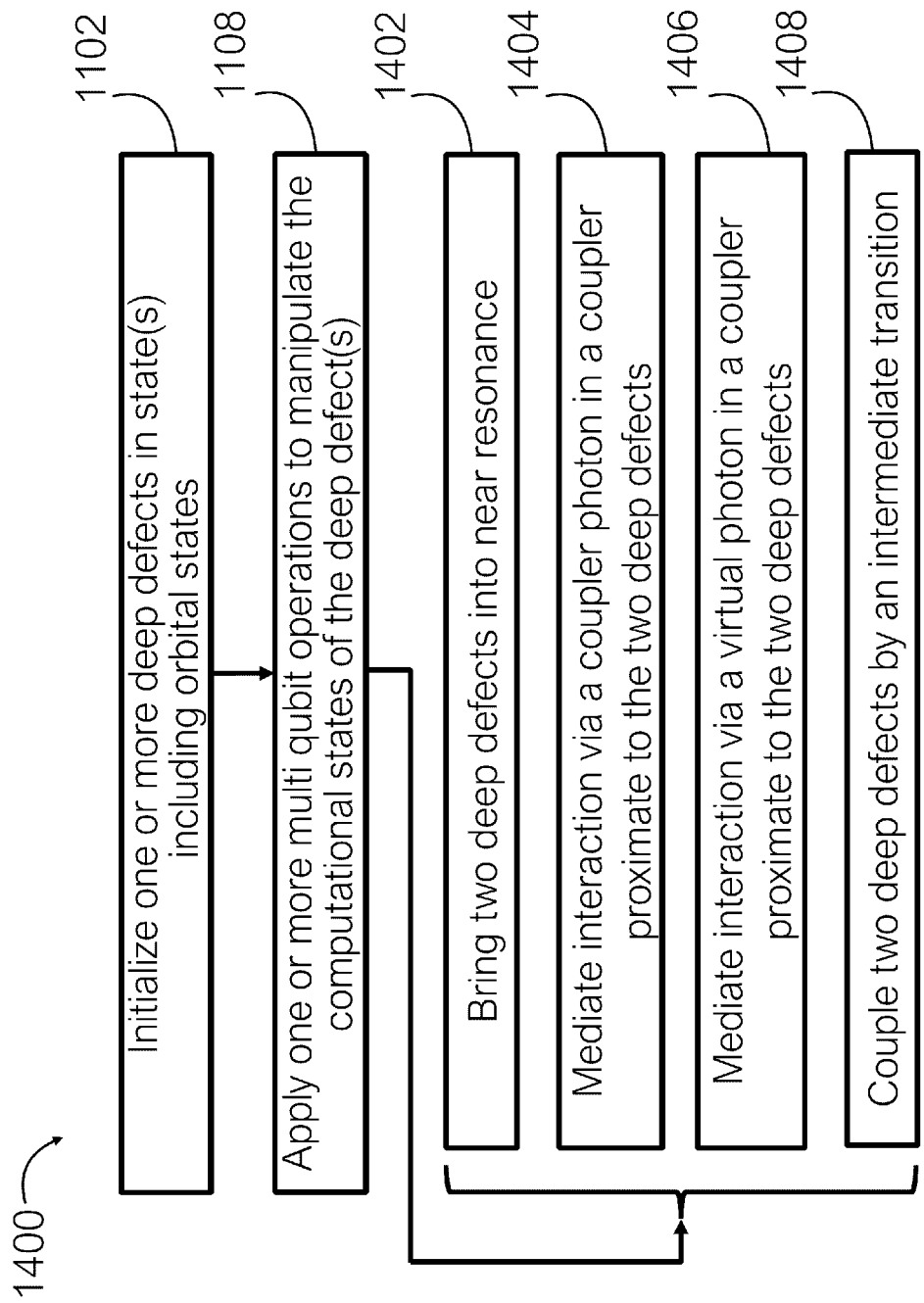
FIG. 14 is a flow-diagram illustrating an implementation of an example method of operation of a quantum information processor including one or more multi-qubit operations.

FIG. 14 illustrates an example method 1400 for operation for a quantum information processor, such as, quantum information processors 700, 800 and 900. One or more acts of method 1400 (e.g., acts 1102, 1108, 1402, 1404) may be performed by or via one or more circuits, for instance one or more hardware processors. In some implementations, method 1400 is performed by a controller, e.g., control subsystem 104 of system 100. In some implementations, the control subsystem 104 executes the quantum information processor control instructions 130 and in response system 100 performs method 1400.

FIG. 14 illustrates, amongst other parts, examples of act 1108 for a quantum information processor, such as, device 200, quantum information processors 700, and 900.

Method 1400 normally begins by invocation from a controller. At 1102, the controller initializes one or more defects in a fiducial state. At 1108, the controller applies one or more multi-qubit operations to manipulate the states of the two or more defects. The controller may apply one or more multi-qubit operations to manipulate the states of the two or more defects in different ways including acts 1402, 1404, 1406, and 1408. Herein reference to two includes two or more unless the context dictates otherwise.

At 1402, the controller brings two defects into near resonance. For example, the controller could bring a defect 204 of type A and a defect 204 of type B shown in FIG. 9 into near resonance. The controller could vary an electric field and/or magnetic field and/or strain for one or more of the two defects. The first defect can have a first transition between a pair of computational states and the second defect can have a second transition between another pair of computational states. The pairs of computational states can be logically equivalent, e.g., two pairs of $|0\rangle$ and $|1\rangle$, that may be based on the same or different orbital states. The controller can cause the first transition to be brought into resonance with the second transition. That is, the resonance condition can be for the energy difference between the first computational states and the second computational state of the respective defects. The controller can bring two or more defects into near resonance by driving the first transition of the first defects at or nearly at the frequency of the second transition of the second defect. The controller can bring two or more defects into near resonance by driving the two or more defects at or nearly at the same rotation frequency. The controller can bring two or more defects into near resonance for a transition in a respective defect's rotating frame. See S. R. Hartmann and E. L. Hahn, 1962 *Phys. Rev.* 128:2042-2053.

At 1404, the controller mediates interaction of two defects via a coupler photon in a coupler proximate to the two defects. For example, coupler 702, an optical structure, disposed proximate to a first defect 204-1 and a second defect 204-2, and communicatively coupled to an input subsystem, e.g., input subsystem 156. The controller could, in response to executing processor-executable instructions, direct the input subsystem to couple the first defect and the second defect via at least one coupler photon disposed in the coupler.

At 1406, the controller mediates interaction of two defects via a virtual photon in a coupler proximate to the two defects. The controller could, in response to executing processor-executable instructions, direct the input subsystem to couple the first defect and the second defect via a virtual photon disposed in the coupler. That is, the first defect and the second defect interact via a vacuum state of the coupler. The controller may effect the multi-qubit operation by, e.g., straining the coupler, or varying carriers in the coupler as shown and described in, at least, FIG. 7.

At 1408, the controller couples two defects via an intermediate transition. For example, a coupler includes a transition that is selectively in resonance with transitions in the first and second defect. The controller may cause an input subsystem to bring a first transition for a first defect, a second transition for a second defect, and the third intermediate coupler transition into near resonance. Method 1400 ends until invoked again.

Figure 15:
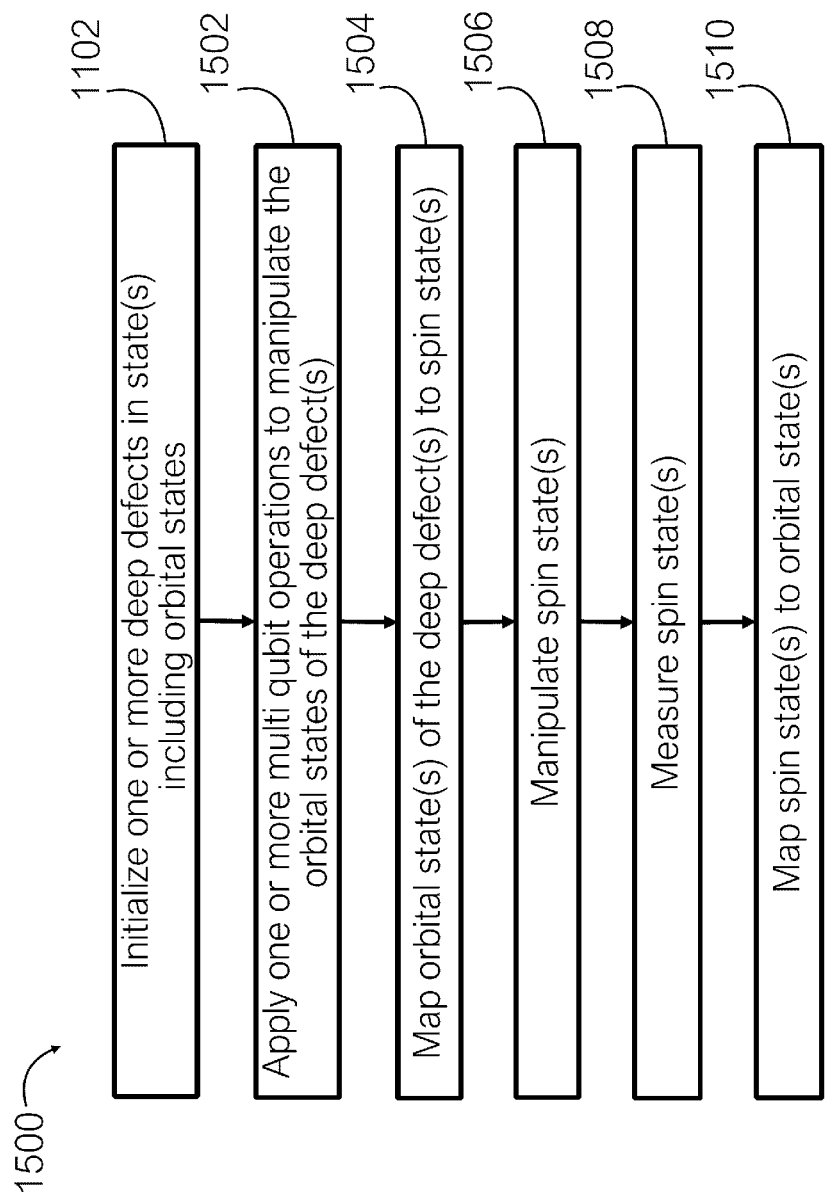
FIG. 15 is a flow-diagram illustrating an implementation of an example method of operation of a quantum information processor, where the method includes a transfer of information from orbital states to spin states or vice versa.

FIG. 15 illustrates an example method 1500 of operation for a quantum information processor, such as, quantum information processors 800 and 900. One or more acts of method 1500 (e.g., acts 1102, 1502, 1504) may be performed by or via one or more circuits, for instance one or more hardware processors. One or more acts of method 1500 may be performed by or via one or more circuits, for instance one or more hardware processors. In some implementations, method 1500 is performed by a controller, e.g., processor 105 of system 100. In some implementations, processor 105 executes the special information processor control instructions 130 and in response system 100 performs method 1500.

FIG. 15 illustrates, amongst other parts, an implementation of a method for operation for a quantum information processor, such as, quantum information processors 700, and 900. Method 1500 includes acts that map information from orbital states to spin states, and/or vice versa.

Method 1500 normally begins by invocation from a controller. At 1102, the controller initializes one or more defects in a fiducial state. At 1502, an optional act, the controller applies one or more operations to manipulate the orbital states of the one or more defects. At 1504, the controller maps the orbital states of the one or more defects to one or more spin states of the one or more defects. At 1506, an optional act, the controller manipulates the spin states of the one or more defects. For example, the input subsystem 156 manipulates a first linear combination of the first spin state and the second spin state into a second linear combination of spin states.

At 1508, an optional act, the controller causes an output subsystem, e.g., output subsystem 158, to measure one or more spin state the one or more defects. Examples of measurement of one or more spins associated with one or more defects is described herein at least with reference to FIG. 12. At 1510, the controller maps the one or more spin states of the one or more defects to the computational (e.g. orbital) states of the one or more defects.

Method 1500 ends until invoked again. Method 1500 may be followed by other methods or acts such as those described with reference to FIG. 12.

EXAMPLES

Examples of quantum information processing devices and systems are described below.

An example quantum information processing device includes a silicon body and one or more deep-level defects disposed within the semiconductor body. A respective deep-level defect included in the one or more deep-level defects has a plurality of orbital states. The plurality of orbital states includes a pair of orbital states that represents computational information. The quantum information processing device further includes a control system communicatively coupled to the semiconductor body and operable to selectively create a linear combination of states from the pair of orbital states that represents computational information.

An example information processing system includes a quantum information processor. The quantum information processor includes semiconductor body. A first deep-level defect is disposed within the semiconductor body. The first deep-level defect includes first plurality of spin-valley-orbital states, a first computational state that includes a first spin-valley-orbital state of the first plurality of spin-valleyorbital states, and a second computational state that includes a second spin-valley-orbital state of the first plurality of spin-valley-orbital states.

Example methods of operation of quantum information processing devices and systems (such as the devices and systems disclosed herein in) are described below.

An example information processing system includes a quantum information processor. The quantum information processor includes a semiconductor body, a first deep-level defect disposed within the semiconductor body, an input subsystem communicatively coupled to the quantum information processor, and at least one processor communicatively coupled to the input subsystem.

An example method for operating such an information processing system includes initializing, via the input subsystem, the first defect to a first computational state that includes a first spin-valley-orbital state.

Example 1: A quantum information processing device including a semiconductor body, consisting principally of silicon, one or more defects disposed within the semiconductor body. A respective defect included in the one or more defects has a plurality of orbital states, and the plurality of orbital states includes a pair of orbital states that represents computational information. The device further includes a control system, comprising circuitry, communicatively coupled to the semiconductor body and, in response to execution of processor executable instruction, creates a linear combination of states from the pair of orbital states that represents computational information.

Example 2: The device of example 1, where the plurality of orbital states further includes a plurality of valley-orbital states, wherein the semiconductor body splits at least one orbital state included in the plurality of orbital states into the plurality of valley-orbital states. And also, the pair of orbital states that represents computational information includes a first computational state including a first valley-orbital state included in the plurality of valley-orbital states, and a second computational state including a second valley-orbital state included in the plurality of valley-orbital states.

Example 3: The device of example 2, where the plurality of orbital-valley states further includes a plurality of spin-valley-orbital states, wherein an electron spin, or an electron spin and a nuclear spin, splits at least one valley-orbital state included in the plurality of valley-orbital states into the plurality of spin-valley-orbital states. And, also, the first computational state further includes a first spin-valley-orbital state included in the plurality of spin-valley-orbital states. The second computational state further includes a second spin-valley-orbital state included in the plurality of spin-valley-orbital states.

Example 4: The device of examples 1-3, characterized by the control system further including a magnetic input component, which in response to execution of processor executable instructions, applies a magnetic field to one or more defects disposed within the semiconductor body, and radio frequency input component, which in response to execution of processor executable instructions, applies a radio frequency pulse to one or more defects disposed within the semiconductor body.

Example 5: The devices of examples 1-4, characterized by the control system further including an antenna, which in response to execution of processor-executable instructions, varies an electric field incident on the semiconductor body.

Example 6: The devices of examples 1-5, where the control system further includes an actuator, which in response to execution of processor-executable instructions, varies a strain profile of the semiconductor body.

Example 7: The devices of examples 1-6, where the control system further includes a chiller, which in response to execution of processor-executable instructions, varies a thermal profile of the semiconductor body.

Example 8: The devices of examples 1-7, where the control system further includes an optical input component, which in response to execution of processor-executable instructions, apples light to the semiconductor body at a first frequency near a second frequency. The second frequency corresponds to an energy difference between the pair of orbital states that represents computational information.

Example 9: The devices of examples 1-8, further including a readout system coupled to the semiconductor body and operable to readout a state of the one or more defects disposed within the semiconductor body.

Example 10: The devices of examples 1-9, where the one or more defects includes a first defect and a second defect, and the device further includes: a coupler communicatively coupled to the first defect, and the second defect, and, which in response to execution of processor-executable instructions, couples the first defect, and the second defect.

Example 11: The devices of examples 1-10, where at least one of the one or more defects is a point defect, a deep-level defect, a luminescent defect, an interstitial defect, a vacancy defect, a substitutional defect, or a damage centre.

Example 12: An information processing system including a quantum information processor which includes: a semiconductor body consisting principally of silicon, and a first defect disposed within the semiconductor body. The first defect includes a first plurality of spin-valley-orbital states, including a first spin-valley-orbital state, and a second spin-valley-orbital state. The system further includes a control subsystem, including circuitry, communicatively coupled to the quantum information processor, and least one processor communicatively coupled to the control subsystem, and at least one tangible computer-readable storage device communicatively coupled to the at least one processor. The storage device stores processor-executable instructions which, when executed by the at least one processor, cause the at least one processor to direct the control subsystem to initialize the first defect to a first computational state that includes the first spin-valley-orbital state.

Example 13: The system of example 12, where the processor-executable instructions to direct the control subsystem to initialize the first defect to the first computational state, which when executed, cause the at least one processor to: wait for the first defect to relax to the first computational state.

Example 14: The systems of examples 12-13, where the processor-executable instructions to direct the control subsystem to initialize the first defect to the first computational state, which when executed, cause the at least one processor to pump the first defect into the first computational state.

Example 15: The systems of examples 12-14, where the processor-executable instructions to direct the control subsystem to initialize the first defect to the first computational state, which when executed, cause the at least one processor to measure the first defect to effect a projection into the first computational state or a second computational state that includes the second spin-valley-orbital state.

Example 16: The systems of examples 12-15, where if the first defect is in the second computational state, the processor-executable instructions to direct the control subsystem to initialize the first defect to the first computational state, which when executed, cause the at least one processor to direct the control subsystem to manipulate the first deep-level defect to the first computational state, or direct the control subsystem to manipulate the first defect based on the first defect being in the second computational state.

Example 17: The systems of examples 12-16, where when executed, the processor-executable instructions further cause the at least one processor to direct the control subsystem to manipulate the first defect to a linear combination of the first computational state and a second computational state.

Example 18: The system of example 17, where the processor-executable instructions to direct the control subsystem to manipulate the defect to a first linear combination of the first computational state and the second computational state, which when executed, cause the at least one processor to apply, via the control subsystem, an input signal near resonant with an energy difference between the first computational state and the second computational state.

Example 19: The system of example 17, where the processor-executable instructions to apply, via the control subsystem, an input signal near resonant with an energy difference between the first computational state and the second computational state, which when executed, cause the at least one processor to: effect a sigma-X operation, effect a sigma-Y operation, or effect a sigma-Z operation.

Example 20: The systems of examples 12-19, where the first defect includes a plurality of spin states including a first spin state and a second spin state, and wherein, when executed, the processor-executable instructions further cause the at least one processor to map, via the control subsystem, the first linear combination of the first computational state and the second computational state to a second linear combination of the first spin state and the second spin state.

Example 21: The system of example 20, where when executed, the processor-executable instructions further cause the at least one processor to direct the control subsystem to manipulate the second linear combination of the first spin state and the second spin state into a third linear combination of the first spin state and the second spin state.

Example 22: The system of example 21, where when executed, the processor-executable instructions further cause the at least one processor to map, via the control subsystem, the third linear combination of the first spin state and the second spin state into a fourth linear combination of the first computational state and the second computational state.

Example 23: The system of example 20, where when executed, the processor-executable instructions further cause the at least one processor to map, via the control subsystem, the second linear combination of the first spin state and the second spin state into a fourth linear combination of the first computational state and the second computational state.

Example 24: The systems of examples 12-23, further including an output subsystem, communicatively coupled to the at least one processor and the quantum information processor. And, where, when executed, the processor-executable instructions further cause the at least one processor to direct the output subsystem to read-out a state for the first defect.

Example 25: The system of example 24, where the processor-executable instructions to read-out a state for the first defect, which when executed, cause the at least one processor to measure an emitted photon from the first defect.

Example 26: The system of example 25 where the processor-executable instructions to read-out a state for the first defect, which when executed, cause the at least one processor to direct the output subsystem to map the state for the first defect to an ancillary photon proximate to the first defect, and direct the output subsystem to measure a state for the ancillary photon.

Example 27: The system of example 26, wherein the processor-executable instructions to direct the output subsystem to measure the state for the ancillary photon, which when executed, cause the at least one processor to direct the output subsystem to measure the state for the ancillary photon via quantum non-demolition measurement.

Example 28: The system of example 25, wherein the first defect includes a plurality of spin states including a first spin state and a second spin state, and wherein, when executed, the processor-executable instructions further cause the at least one processor to map, via the control subsystem, the first linear combination of the first computational state and the first computational state to a second linear combination of the first spin state and the second spin state. The processor-executable instructions to read-out a state for the first defect, which when executed, cause the at least one processor to measure a spin state included in the plurality of spin states.

Example 29: The systems of example 12-28, further including a second defect disposed within the semiconductor body. The second defect includes a second plurality of spin-valley-orbital states including a third spin-valley-orbital state and a fourth spin-valley-orbital state. Also, a third computational state includes there third spin-valley-orbital state, and a fourth computational state that includes the fourth spin-valley-orbital state.

Example 30: The system of example 29, where the first computational state is logically equivalent to the third computational state, and the second computational state is logically equivalent to the fourth computational state.

Example 31: The system of example 30, where the first spin-valley-orbital state is equal to the third spin-valley-orbital state, and the second spin-valley-orbital state is equal to the fourth spin-valley-orbital state.

Example 32: The system of example 29, further including a coupler disposed proximate to the first defect and the second defect, and communicatively coupled to the control subsystem, and, the device further including, wherein, when executed, the processor-executable instructions further cause the at least one processor to direct the control subsystem to couple the first defect and the second defect.

Example 33: The device of example 32, the processor-executable instructions to couple the first defect and the second defect, which when executed, further cause the at least one processor to direct the control subsystem to couple the first defect and the second defect via a coupler photon disposed in the coupler. The processor-executable instructions to couple the first defect and the second defect, which when executed, further cause the at least one processor to direct the control subsystem to couple the first defect and the second defect via a virtual photon disposed in the coupler, and direct the control subsystem to bring a first transition between the first computational state and the second computational state into near resonance with a second transition between third computational state and the fourth computational state. Or where the coupler includes a third transition, direct the control subsystem to bring the first transition, the second transition, and the third transition to be brought into near resonance.

Example 34: The systems of examples 12-28, where the first defect is a point defect, a deep-level defect, a luminescent defect, an interstitial defect, a vacancy defect, a substitutional defect, or a damage centre.

Example 35: The systems of examples 29-33, where the second defect is a point defect, a deep-level defect, a luminescent defect, an interstitial defect, a vacancy defect, a substitutional defect, or a damage centre.

Example 36: A method of operation of an information processing system including a quantum information processor including a semiconductor body, a first defect disposed within the semiconductor body, a control subsystem communicatively coupled to the quantum information processor, and at least one processor communicatively coupled to the control subsystem, the method including initializing, via the control subsystem, the first defect to a first computational state that includes a first spin-valley-orbital state.

Example 37: The method of example 36, where initializing the first defect to the first computational state includes waiting for the first defect to relax to the first computational state.

Example 38: The methods of examples 36 or 37, where initializing the first defect to the first computational state includes pumping, via the control subsystem, the first defect into the first computational state.

Example 39: The methods of examples 36-38, where initializing the first defect to the first computational state includes: measuring the first defect to effect a projection of the first defect into the first computational state or a second computational state that includes a second spin-valley-orbital state.

Example 40: The method of example 39, where if the first defect is in the second computational state, the method further includes manipulating, via the control subsystem, the first defect to the first computational state, or changing, by the at least one processor, one or more manipulations to be performed by the control subsystem on the first defect based on the first defect being in the second computational state.

Example 41: The methods of examples 36-40 further including manipulating, via the control subsystem, the first defect to a linear combination of the first computational state and a second computational state that includes a second spin-valley-orbital state.

Example 42: The method of example 41 where manipulating the first defect to the linear combination of the first computational state and the second computational state includes applying, via the control subsystem, an input signal near resonant with an energy difference between the first computational state and the second computational state.

Example 43: The method of example 41 where manipulating the first defect to the linear combination of the first computational state and the second computational state includes applying, via the control subsystem, a sigma-X operation, applying, via the control subsystem, a sigma-Y operation, or applying, via the control subsystem, a sigma-Z operation.

Example 44: The method of example 41 where the first defect includes a plurality of spin states including a first spin state and a second spin state, the method further includes mapping, via the control subsystem, the first linear combination of the first computational state and the second computational state to a second linear combination of the first spin state and the second spin state.

Example 45: The method of example 44, further includes manipulating, via the control subsystem, the second linear combination of the first spin state and the second spin state into a third linear combination of the first spin state and the second spin state.

Example 46: The method of example 45, further including mapping, via the control subsystem, the third linear combination of the first spin state and the second spin state into a fourth linear combination of the first computational state and the second computational state.

Example 47: The method of example 44, further including mapping, via the control subsystem, the second linear combination of the first spin state and the second spin state into a fifth linear combination of the first computational state and the second computational state.

Example 48: The method of examples 36-47, where the information processing system further includes an output subsystem, communicatively coupled to the at least one processor and the quantum information processor, the method further including measuring, via the output subsystem, a state for the first defect.

Example 49: The method of example 46, further including measuring, via the output subsystem, an emitted photon from the first defect.

Example 50: The method of example 49, further including mapping the state for the first defect to an ancillary photon proximate to the first defect, and measuring, via the output subsystem, a state for the ancillary photon.

Example 51: The method of example 50, where measuring, via the output subsystem, the state for the ancillary photon, further includes measuring, via the output subsystem, the state for the ancillary photon via quantum non-demolition measurement.

Example 52: The method of example 50, where the first defect includes a plurality of spin states including a first spin state and a second spin state, and the method further includes mapping, via the control subsystem, the first linear combination of the first computational state and the first computational state to a second linear combination of the first spin state and the second spin state. The method also includes measuring, via the output subsystem, a spin state included in the plurality of spin states.

Example 53: The method of example 50, where the quantum information processor further includes a second defect disposed within the semiconductor body. And the method further includes measuring, via the output subsystem, a parity state for the first defect and the second defect.

Example 54: The method of example 38 where the quantum information processor further includes a second defect disposed within the semiconductor body, a coupler disposed proximate to the first defect and the second defect, and communicatively coupled to the control subsystem. The method further includes coupling, via the coupler, the first defect and the second defect.

Example 55: The method of example 54 where coupling, via the coupler, the first defect and the second defect further includes coupling the first defect and the second defect via a coupler photon disposed in the coupler.

Example 56: The method of example 54 where coupling, via the coupler, the first defect and the second defect further includes coupling the first defect and the second defect via a virtual photon disposed in the coupler.

Example 57: The methods of examples 36-56 where the first defect has a second computational state that includes a second spin-valley-orbital state, the quantum information processor further includes a second defect disposed within the semiconductor body, and has a third computational state that includes a third spin-valley-orbital and a fourth computational state that includes a fourth spin-valley-orbital state. The method further includes: causing a first transition between the first computational state and the second computational state to be brought into near resonance with a second transition between third computational state and the fourth computational state.

Example 58: The method of example 57 where the quantum information processor further includes a coupler disposed proximate to the first defect and the second defect, and the coupler includes a third transition, the method further includes causing the first transition, the second transition, and the third transition to be brought into near resonance.

Unless otherwise specified herein, or unless the context clearly dictates otherwise the term about modifying a numerical quantity means plus or minus ten (10) percent. Unless otherwise specified, or unless the context dictates otherwise, between two numerical values is to be read as between and including the two numerical values.

In the above description, some specific details are included to provide an understanding of various disclosed implementations. One skilled in the relevant art, however, will recognize that implementations may be practiced without one or more of these specific details, parts of a method, components, materials, etc. In some instances, well-known structures associated with semiconductor and/or optical devices and/or quantum computing and/or quantum information processing, such as targets, substrates, lenses, waveguides, shields, filters, lasers, processor-executable instructions (e.g., BIOS, drivers), have not been shown or described in detail to avoid unnecessarily obscuring descriptions of the disclosed implementations.

In this specification and appended claims "a", "an", "one", or "another" applied to "embodiment", "example", or "implementation" is used in the sense that a particular referent feature, structure, or characteristic described in connection with the embodiment, example, or implementation is included in at least one embodiment, example, or implementation. Thus, phrases like "in one embodiment", "in an embodiment", or "another embodiment" are not necessarily all referring to the same embodiment. Furthermore, the particular features, structures, or characteristics may be combined in any suitable manner in one or more embodiments, examples, or implementations.

As used in this specification and the appended claims, the singular forms of articles, such as "a", "an", and "the", include plural referents unless the context mandates otherwise. It should also be noted that the term "or" is generally employed in its sense including "and/or" unless the context mandates otherwise.

Unless the context requires otherwise, throughout this specification and appended claims, the word "comprise" and variations thereof, such as, "comprises" and "comprising" are to be interpreted in an open, inclusive sense, that is, as "including, but not limited to".

All of the US patents, US patent application publications, US patent applications, foreign patents, foreign patent applications, and non-patent publications referred to in this specification, or referred to on any application data sheet, are incorporated herein by reference in their entireties for all purposes.

While certain features of the described embodiments and implementations have been described herein, many modifications, substitutions, changes and equivalents will now occur to those skilled in the art. It is, therefore, to be understood that the appended claims are intended to cover all such modifications and changes as fall within the scope of the described embodiments and implementations.

Interpretation of Terms

Unless the context clearly requires otherwise, throughout the description and the claims:
"comprise", "comprising", and the like are to be construed in an inclusive sense, as opposed to an exclusive or exhaustive sense; that is to say, in the sense of "including, but not limited to";
"connected", "coupled", or any variant thereof, means any connection or coupling, either direct or indirect, between two or more elements; the coupling or connection between the elements can be physical, logical, or a combination thereof;
"herein", "above", "below", and words of similar import, when used to describe this specification, shall refer to this specification as a whole, and not to any particular portions of this specification;
"or", in reference to a list of two or more items, covers all of the following interpretations of the word: any of the items in the list, all of the items in the list, and any combination of the items in the list;
the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the invention and control systems in embodiments of the invention may be implemented using specifically designed hardware, configurable hardware, programmable data processors configured by the provision of software (which may optionally comprise "firmware") capable of executing on the data processors, special purpose computers or data processors that are specifically programmed, configured, or constructed to perform one or more steps in a method as explained in detail herein and/or combinations of two or more of these. Examples of specifically designed hardware are: logic circuits, application-specific integrated circuits ("ASICs"), large scale integrated circuits ("LSIs"), very large scale integrated circuits ("VLSIs"), and the like. Examples of configurable hardware are: one or more programmable logic devices such as programmable array logic ("PALs"), programmable logic arrays ("PLAs"), and field programmable gate arrays ("FPGAs"). Examples of programmable data processors are: microprocessors, digital signal processors ("DSPs"), embedded processors, graphics processors, math co-processors, general purpose computers, server computers, cloud computers, mainframe computers, computer workstations, and the like. For example, one or more data processors in a control circuit for a device may implement methods as described herein by executing software instructions in a program memory accessible to the processors.

Processing may be centralized or distributed. Where processing is distributed, information including software and/or data may be kept centrally or distributed. Such information may be exchanged between different functional units by way of a communications network, such as a Local Area Network (LAN), Wide Area Network (WAN), or the Internet, wired or wireless data links, electromagnetic signals, or other data communication channel.

While processes or blocks are presented in a given order, alternative examples may perform routines having steps, or employ systems having processes or blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Some embodiments of the invention are provided in the form of a program product. The program product may comprise any non-transitory medium which carries a set of computer-readable instructions which, when executed by a data processor, cause the data processor to execute or coordinate execution of a method of the invention. Program products according to the invention may be in any of a wide variety of forms. The program product may comprise, for example, non-transitory media such as magnetic data storage media including floppy diskettes, hard disk drives, optical data storage media including CD ROMs, DVDs, electronic data storage media including ROMs, flash RAM, EPROMs, hardwired or preprogrammed chips (e.g., EEPROM semiconductor chips), nanotechnology memory, or the like. The computer-readable signals on the program product may optionally be compressed or encrypted.

In some embodiments, the invention may be implemented in software. For greater clarity, "software" includes any instructions executed on a processor, and may include (but is not limited to) firmware, resident software, microcode, and the like. Both processing hardware and software may be centralized or distributed (or a combination thereof), in whole or in part, as known to those skilled in the art. For example, software and other modules may be accessible via local memory, via a network, via a browser or other application in a distributed computing context, or via other means suitable for the purposes described above.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments" or "in some implementations". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible). This is the case even if features A and B are described with reference to different drawings and/or described in different paragraphs of the description and/or described with reference to different example embodiments or implementations.

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

What is claimed is:

1. A quantum information processing device comprising:
   a semiconductor body, consisting principally of silicon;
   one or more luminescent defects disposed within the semiconductor body, the one or more luminescent defects being selected from the group consisting of: interstitial defect, vacancy defect, substitutional defect and damage centre, wherein:
   a respective luminescent defect included in the one or more luminescent defects has a plurality of orbital states, and
   the plurality of orbital states includes a pair of orbital states that represents computational information; and
   a control system, comprising circuitry, communicatively coupled to the semiconductor body and, configured by processor executable instructions to initialize the one or more luminescent defects.

2. The device of claim 1, wherein:
   the plurality of orbital states further includes a plurality of valley-orbital states, wherein the semiconductor body splits at least one orbital state included in the plurality of orbital states into the plurality of valley-orbital states; and
   the pair of orbital states that represents computational information includes:
   a first computational state comprising a first valley-orbital state included in the plurality of valley-orbital states, and
   a second computational state comprising a second valley-orbital state included in the plurality of valley-orbital states.

3. The device of claim 2, wherein:
   the plurality of orbital-valley states further includes a plurality of spin-valley-orbital states, wherein an electron spin, or an electron spin and a nuclear spin, splits at least one valley-orbital state included in the plurality of valley-orbital states into the plurality of spin-valley-orbital states;
the first computational state further comprises a first spin-valley-orbital state included in the plurality of spin-valley-orbital states; and
the second computational state further comprises a second spin-valley-orbital state included in the plurality of spin-valley-orbital states.

4. The device of claim 1 wherein the control system comprises an input subsystem comprising circuitry communicatively coupled to the semiconductor body and the one or more luminescent defects, the control system configured by the processor executable instructions to operate the input subsystem to manipulate information stored in the pair of orbital states that represents computational information.

5. The device of claim 1, wherein the control system comprises an input subsystem, comprising circuitry, communicatively coupled to the semiconductor body and the one or more luminescent defects, wherein the control subsystem is configured by the processor executable instructions to operate the input subsystem to create a linear combination of states from the pair of orbital states that represents computational information.

6. The device of claim 1, wherein the one or more luminescent defects includes a first luminescent defect and a second luminescent defect, and the device comprises a coupler communicatively coupled to the first luminescent defect, and the second luminescent defect, wherein the control system is configured to control the coupler to operate the coupler to couple the first luminescent defect and the second luminescent defect.

7. The device of claim 1, wherein the control system comprises a readout system coupled to the semiconductor body wherein the control system is configured by the processor-executable instructions to operate the readout system to read out a state of the one or more luminescent defects disposed within the semiconductor body.

8. The device of claim 1, wherein the semiconductor body consists principally of natural silicon.

9. The device of claim 1, wherein the semiconductor body consists principally of purified silicon.

10. The device of claim 1, wherein the one or more luminescent defects are selected from the group consisting of interstitial defects, and vacancy defects.

11. The device of claim 1, wherein the one or more luminescent defects are substitutional defects.

12. The device of claim 1, comprising a communication channel optically and communicatively coupled to the one or more luminescent defects disposed within the semiconductor body.

13. An information processing system comprising:
a quantum information processor including:
a semiconductor body consisting principally of silicon;
a first luminescent defect disposed within the semiconductor body, the first luminescent defect selected from the group consisting of: interstitial defect, vacancy defect, substitutional defect and damage centre, wherein the first luminescent defect includes:
a first plurality of spin-valley-orbital states, comprising a first spin-valley-orbital state, and a second spin-valley-orbital state;
a control subsystem;
at least one processor communicatively coupled to the control subsystem;
at least one tangible computer-readable storage device communicatively coupled to the at least one processor and which stores processor-executable instructions which, when executed by the at least one processor, cause the at least one processor to:
direct the control subsystem to initialize the first luminescent defect to a first computational state that includes the first spin-valley-orbital state.

14. The system of claim 13, wherein:
the control system includes an input subsystem, comprising circuitry, communicatively coupled to the at least one processor; and
the at least one processor is configured by the processor-executable instructions to cause the at least one processor to direct the input subsystem to create at the first luminescent defect a linear combination of the first computational state and a second computational state.

15. The system of claim 13, wherein the control system comprises:
an input subsystem, comprising circuitry, communicatively coupled to the semiconductor body and the one or more luminescent defects, and wherein the at least one processor is configured by the processor-executable instructions to cause the at least one processor to direct the input subsystem to manipulate information stored the first luminescent defect.

16. The system of claim 15, wherein the at least one processor is configured by the processor-executable instructions to apply, via the input subsystem, an input signal near resonant with an energy difference between the first computational state and the second computational state.

17. The system of claim 13, wherein the at least one processor is configured by the processor-executable instructions to cause the at least one processor to:
effect a sigma-X operation,
effect a sigma-Y operation, or
effect a sigma-Z operation.

18. The system of claim 17, wherein the at least one processor is configured by the processor-executable instructions to direct the input subsystem to manipulate the second linear combination of the first spin state and the second spin state into a third linear combination of the first spin state and the second spin state.

19. The system of claim 18, wherein the at least one processor is configured by the processor-executable instructions to map, via the input subsystem, the third linear combination of the first spin state and the second spin state into a fourth linear combination of the first computational state and the second computational state.

20. The system of claim 13, wherein the first luminescent defect includes a plurality of spin states comprising a first spin state and a second spin state, and wherein the at least one processor is configured by the processor-executable instructions to map, via the input subsystem, the first linear combination of the first computational state and the second computational state to a second linear combination of the first spin state and the second spin state.

21. The system of claim 20, wherein the at least one processor is configured by the processor-executable instructions to map, via the input subsystem, the second linear combination of the first spin state and the second spin state into a fourth linear combination of the first computational state and the second computational state.

22. The system of claim 13 wherein:
the control system includes an output subsystem comprising circuitry, communicatively coupled to the at least one processor; and the at least one processor is configured by the processor-executable instructions to direct the output subsystem to read-out a state for the first luminescent defect.

23. The system of claim 13, wherein the at least one processor is configured by the processor-executable instructions to measure an emitted photon from the first luminescent defect.

24. The system of claim 13, wherein the at least one processor is configured by the processor-executable instructions to direct the output subsystem to map the state for the first luminescent defect to an ancillary photon proximate to the first luminescent defect; and
   direct the output subsystem to measure a state for the ancillary photon.

25. The system of claim 13, wherein the first luminescent defect includes a plurality of spin states including a first spin state and a second spin state, and wherein the at least one processor is configured by the processor-executable instructions to map, via the input subsystem, the first linear combination of the first computational state and the second computational state to a second linear combination of the first spin state and the second spin state; and
   measure a spin state included in the plurality of spin states.

26. An information processing system comprising:
   a quantum information processor including:
      a semiconductor body consisting principally of silicon;
      a first luminescent defect disposed within the semiconductor body; wherein the first luminescent defect includes:
         a first plurality of spin-valley-orbital states, comprising a first spin-valley-orbital state, and a second spin-valley-orbital state;
      a control subsystem;
      at least one processor communicatively coupled to the control subsystem;
      at least one tangible computer-readable storage device communicatively coupled to the at least one processor and which stores processor-executable instructions which, when executed by the at least one processor, cause the at least one processor to:
         direct the control subsystem to initialize the first luminescent defect to a first computational state that includes the first spin-valley-orbital state;
   the system further comprising:
   a second luminescent defect disposed within the semiconductor body, wherein the second luminescent defect includes a second plurality of spin-valley-orbital states comprising a third spin-valley-orbital state and a fourth spin-valley-orbital state; and
   wherein a third computational state includes the third spin-valley-orbital state, and a fourth computational state that includes the fourth spin-valley-orbital state.

27. The system of claim 26, wherein:
   the first computational state is logically equivalent to the third computational state; and
   the second computational state is logically equivalent to the fourth computational state.

28. The system of claim 27, comprising:
   a coupler disposed proximate to the first luminescent defect and the second luminescent defect, and communicatively coupled to the control subsystem; and
   wherein the at least one processor is configured by the processor-executable instructions to direct the control subsystem to operate the coupler to couple the first luminescent defect and the second luminescent defect.

29. The system of claim 26, wherein:
   the first spin-valley-orbital state is equal to the third spin-valley-orbital state; and
   the second spin-valley-orbital state is equal to the fourth spin-valley-orbital state.

30. The system of claim 26, wherein the first luminescent defect is selected from the group consisting of interstitial defect, vacancy defect, substitutional defect, and damage centre.

* * * * *